United States Patent
Lee et al.

(10) Patent No.: US 12,468,656 B2
(45) Date of Patent: Nov. 11, 2025

(54) SIGNAL PROCESSING DEVICE AND VEHICLE COMMUNICATION DEVICE INCLUDING THE SAME

(71) Applicant: LG ELECTRONICS INC., Seoul (KR)

(72) Inventors: Sanghun Lee, Seoul (KR); Hyuntaek Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 19 days.

(21) Appl. No.: 18/289,986

(22) PCT Filed: May 12, 2022

(86) PCT No.: PCT/KR2022/006833
§ 371 (c)(1),
(2) Date: Nov. 8, 2023

(87) PCT Pub. No.: WO2022/240217
PCT Pub. Date: Nov. 17, 2022

(65) Prior Publication Data
US 2024/0248872 A1 Jul. 25, 2024

(30) Foreign Application Priority Data
May 14, 2021 (KR) .................. 10-2021-0062797

(51) Int. Cl.
*G06F 15/167* (2006.01)
*G06F 15/17* (2006.01)
(Continued)

(52) U.S. Cl.
CPC ............ *G06F 15/167* (2013.01); *G06F 15/17* (2013.01); *G06F 15/17306* (2013.01); *G06F 13/38* (2013.01)

(58) Field of Classification Search
CPC .. G06F 15/167; G06F 15/17; G06F 15/17306; G06F 13/38
See application file for complete search history.

(56) References Cited

U.S. PATENT DOCUMENTS

2020/0014741 A1* 1/2020 ElWazeer ................ G06F 3/165
2020/0169555 A1* 5/2020 Chung ................ H04L 63/0876
(Continued)

FOREIGN PATENT DOCUMENTS

KR           100561636      3/2006
KR        1020090132770    12/2009
(Continued)

OTHER PUBLICATIONS

PCT International Application No. PCT/KR2022/006833, International Search Report dated Aug. 23, 2022, 2 pages.
(Continued)

*Primary Examiner* — Henry Tsai
*Assistant Examiner* — John B Roche
(74) *Attorney, Agent, or Firm* — LEE, HONG, DEGERMAN, KANG & WAIMEY

(57) ABSTRACT

A signal processing device and a vehicle communication device including the same are disclosed. The signal processing device according to an embodiment of the present disclosure includes: a first processor configured to receive a first message including a sensor signal in a vehicle based on a first communication scheme; a second processor configured to receive a second message including a communication message received from an external source based on a second communication scheme; and a shared memory configured to operate to transmit the first message or the second message between the first processor and the second proces-
(Continued)

sor. Accordingly, it is possible to reduce latency and to perform high-speed data transmission during inter-processor communication.

19 Claims, 22 Drawing Sheets

(51) Int. Cl.
*G06F 15/173* (2006.01)
*G06F 13/38* (2006.01)

(56) References Cited

U.S. PATENT DOCUMENTS

2020/0344090 A1* 10/2020 Park .................. H04L 12/66
2021/0021442 A1 1/2021 Zhou et al.
2021/0073116 A1* 3/2021 Rogers ................ G06F 12/023

FOREIGN PATENT DOCUMENTS

| KR | 1020170099701 | 9/2017 |
| KR | 1020200125133 | 11/2020 |
| KR | 102244569 | 4/2021 |

OTHER PUBLICATIONS

European Patent Office Application Serial No. 22807864.8, Search Report dated Apr. 8, 2025, 11 pages.

* cited by examiner

FIG. 8A

Tba

| 0 | data_0 |
|---|---|
| 1 | data_1 |
| 2 | data_2 |
| 3 | data_3 |
| 4 | data_4 |
| 5 | data_5 |
| ... | ... |
| 2047 | data_2047 |

FIG. 8B

Tbb

| 0 | App Name_0 |
|---|---|
| 1 | App Name_1 |
| 2 | App Name_2 |
| 3 | App Name_3 |
| 4 | App Name_4 |
| 5 | App Name_5 |
| ... | ... |

FIG. 12B

| Index | Data |
|---|---|
| 1 | Distance,48 |
| 2 | B_CAN_Status,1 |
| 3 | Distance,50 |
| 4 | Speed,100 |
| 5 | Distance,50 |
| 6 | B_CAN_Status,1 |
| 7 | Distance,50 |
| 8 | Speed,100 |
| 9 | Distance,51 |
| 10 | B_CAN_Status,1 |
| 11 | Distance,52 |
| 12 | Speed,99 |
| 13 | Distance,50 |
| 14 | B_CAN_Status,1 |
| 15 | Distance,50 |
| 16 | Speed,100 |
| 17 | Distance,49 |

Tb2

SIGNAL PROCESSING DEVICE AND VEHICLE COMMUNICATION DEVICE INCLUDING THE SAME

CROSS-REFERENCE TO RELATED APPLICATION(S)

This application is the National Stage filing under 35 U.S.C. 371 of International Application No. PCT/KR2022/006833, filed on May 12, 2022, which claims the benefit of earlier filing date and right of priority to Korean Application No. 10-2021-0062797, filed on May 14, 2021, the contents of which are all incorporated by reference herein in their entirety.

BACKGROUND

1. Technical Field

The present disclosure relates to a signal processing device and a vehicle communication device including the same, and more particularly to a signal processing device capable of reducing latency and performing high-speed data transmission during inter-processor communication, and a vehicle communication device including the signal processing device.

2. Description of the Related Art

A vehicle is a machine that allows a user to move in a desired direction. A representative example of the vehicle is a car.

Meanwhile, a vehicle communication device is mounted in the vehicle for user convenience.

Particularly, a gateway which is a high-speed router may be used for data communication between a plurality of in-vehicle processors.

Korean Patent No. 10-1020948 (hereinafter referred to as "related art") relates to a vehicle network gateway and a network system, in which a mobile terminal supports wireless LAN via the internet by using a vehicle telematics module.

However, the related art has a problem in that the vehicle network gateway uses communication protocols, such as UART, SPI, etc., such that due to a low bandwidth and unnecessary memory copy, real-time data transmission and large data transmission may not be accomplished.

SUMMARY

It is an object of the present disclosure to provide a signal processing device capable of reducing latency and performing high-speed data transmission during inter-processor communication, and a vehicle communication device including the signal processing device.

Meanwhile, it is another object of the present disclosure to provide a signal processing device capable of reducing latency and performing high-speed data transmission during inter-processor communication by minimizing buffer occupancy of the same data, and a vehicle communication device including the signal processing device.

Meanwhile, it is yet another object of the present disclosure to provide a signal processing device capable of ensuring real-time transmission of a high priority event during inter-processor communication, and a vehicle communication device including the signal processing device.

Meanwhile, it is still another object of the present disclosure to provide a signal processing device capable of reducing memory overhead during memory access, and a vehicle communication device including the signal processing device.

In accordance with an aspect of the present disclosure, the above and other objects can be accomplished by providing a signal processing device and a vehicle communication device including the same, which include: a first processor configured to receive a first message including a sensor signal in a vehicle based on a first communication scheme and to perform signal processing of the received first message: a second processor configured to receive a second message including a communication message received from an external source based on a second communication scheme, and to perform signal processing of the received second message: and a shared memory configured to operate to transmit the first message or the second message between the first processor and the second processor.

Meanwhile, the signal processing device and the vehicle communication device including the same may further include: a transceiver, which based on the first communication scheme, is configured to receive a first message including a sensor signal in a vehicle and to transmit the first message to the first processor: and the switch, which based on the second communication scheme, is configured to receive a second message including a communication message received from an external source, and to transmit the second message to the second processor.

Meanwhile, the first processor may include a first manager including a first cache for inter-processor communication (IPC); and the second processor may include a second manager including a timer and a second cache for the IPC.

Meanwhile, upon receiving the first message for which subscription is requested, the first processor may store the first message in the first cache or may manage the first message, and upon receiving the first message, the first processor may compare the first message with a value stored in the first cache, and in response to a difference therebetween being greater than or equal to a predetermined value, the first processor may transmit the first message to the second processor through the IPC.

Meanwhile, upon receiving the first message for which subscription is requested, the first processor may store the first message in the first cache or may manage the first message, and upon receiving the first message, the first processor may compare the first message with a value stored in the first cache, and in response to a difference therebetween being greater than or equal to a predetermined value, the first processor may transmit the first message to the second processor through the IPC using the shared memory.

Meanwhile, the second processor may receive a request for subscription to the first message from an Ethernet processor and may transmit the subscription request through the IPC.

Meanwhile, upon first receiving the first message, the second processor may store the first message in the second cache, and upon subsequently receiving the first message, the second processor may update the second cache.

Meanwhile, upon receiving the first message, the second processor may generate a thread of the timer, and each time the thread terminates, the second processor may send a value in the second cache to the Ethernet processor.

Meanwhile, during a period in which the IPC is not performed and the first message is not received, the second processor may send a value in the second cache to the Ethernet processor.

Meanwhile, during a period in which the IPC is performed and the first message is received, the second processor may send a value in the updated second cache to the Ethernet processor.

Meanwhile, during the IPC, the shared memory may transmit data between the first processor and the second processor through a first queue, and a second queue having a higher priority than the first queue.

Meanwhile, the shared memory may transmit speed data or position information data between the first processor and the second processor through the second queue.

Meanwhile, the first processor or the second processor may manage a list of applications capable of using the second queue.

Meanwhile, in case in which a number of events for the IPC increases, the shared memory may transmit only data, corresponding to events allocated for the second queue, through the second queue.

Meanwhile, during the IPC, the shared memory may allocate buffers of a size aligned with memory blocks or memory addresses.

Meanwhile, the shared memory may set a smaller number of buffers than a number of periodic events for the IPC.

Meanwhile, in response to a request for subscription to preceding vehicle distance information, the second processor may transmit the request for subscription to the preceding vehicle distance information to the first processor, wherein the first processor may receive the preceding vehicle distance information from a radar sensor, and upon receiving the preceding vehicle distance information, the first processor may compare the information with a value stored in the first cache, and in response to a difference therebetween being greater than or equal to a predetermined value, the first processor may store the preceding vehicle distance information in the first cache and may send the value stored in the first cache to the second processor through the IPC.

Meanwhile, through the IPC, the second processor may store the preceding vehicle distance information in the second cache and may transmit the preceding vehicle distance information stored in the second cache to an application which has transmitted the request for subscription to the preceding vehicle distance information.

Meanwhile, in response to a request for subscription to preceding vehicle distance information, the second processor may transmit the request for subscription to the preceding vehicle distance information to the first processor, wherein the first processor may receive the preceding vehicle distance information from a radar sensor, and upon receiving the preceding vehicle distance information, the first processor may compare the information with a value stored in the first cache, and in response to a difference therebetween being less than a predetermined value, the first processor may not store the received preceding vehicle distance information in the first cache and may not transmit the information to the second processor through the IPC.

Meanwhile, the signal processing device and the vehicle communication device including the same may further include: a first memory including an IPC channel; and a second memory storing sensor data including vehicle speed data, wherein the shared memory may be provided in the first memory.

Meanwhile, the first processor may implement a message router, wherein the message router may convert a frame of the first message into a frame format of the second message, and may transmit the converted message to the second processor.

Effects of the Disclosure

A signal processing device and a vehicle communication device including the same according to an embodiment of the present disclosure include: a first processor configured to receive a first message including a sensor signal in a vehicle based on a first communication scheme and to perform signal processing of the received first message: a second processor configured to receive a second message including a communication message received from an external source based on a second communication scheme, and to perform signal processing of the received second message: and a shared memory configured to operate to transmit the first message or the second message between the first processor and the second processor. Accordingly, during communication between the first processor and the second processor, inter-processor communication is performed using the shared memory, thereby reducing latency and performing high-speed data transmission during the inter-processor communication.

Meanwhile, the signal processing device and the vehicle communication device including the same may further include: a transceiver, which based on the first communication scheme, is configured to receive a first message including a sensor signal in a vehicle and to transmit the first message to the first processor; and the switch, which based on the second communication scheme, is configured to receive a second message including a communication message received from an external source, and to transmit the second message to the second processor. Accordingly, the first message and the second message may be stably transmitted to the first processor and the second processor.

Meanwhile, the first processor may include a first manager including a first cache for inter-processor communication (IPC); and the second processor may include a second manager including a timer and a second cache for the IPC, thereby reducing latency and performing high-speed data transmission during the inter-processor communication.

Meanwhile, upon receiving the first message for which subscription is requested, the first processor may store the first message in the first cache or may manage the first message, and upon receiving the first message, the first processor may compare the first message with a value stored in the first cache, and in response to a difference therebetween being greater than or equal to a predetermined value, the first processor may transmit the first message to the second processor through the IPC. Accordingly, by minimizing cache occupancy or buffer occupancy of the same data, latency may be reduced and high-speed data transmission may be performed during the inter-processor communication.

Meanwhile, upon receiving the first message for which subscription is requested, the first processor may store the first message in the first cache or may manage the first message, and upon receiving the first message, the first processor may compare the first message with a value stored in the first cache, and in response to a difference therebetween being greater than or equal to a predetermined value, the first processor may transmit the first message to the second processor through the IPC using the shared memory. Accordingly, by minimizing cache occupancy or buffer occupancy of the same data, latency may be reduced and high-speed data transmission may be performed during the inter-processor communication.

Meanwhile, the second processor may receive a request for subscription to the first message from an Ethernet processor and may transmit the subscription request through the IPC. Accordingly, the IPC may be performed.

Meanwhile, upon first receiving the first message, the second processor may store the first message in the second cache, and upon subsequently receiving the first message, the second processor may update the second cache. Accordingly, latency may be reduced and high-speed data transmission may be performed during the inter-processor communication.

Meanwhile, upon receiving the first message, the second processor may generate a thread of the timer, and each time the thread terminates, the second processor may send a value in the second cache to the Ethernet processor. Accordingly, latency may be reduced and high-speed data transmission may be performed during the inter-processor communication.

Meanwhile, during a period in which the IPC is not performed and the first message is not received, the second processor may send a value in the second cache to the Ethernet processor. Accordingly, latency may be reduced and high-speed data transmission may be performed during the inter-processor communication.

Meanwhile, during a period in which the IPC is performed and the first message is received, the second processor may send a value in the updated second cache to the Ethernet processor. Accordingly, latency may be reduced and high-speed data transmission may be performed during the inter-processor communication.

Meanwhile, during the IPC, the shared memory may transmit data between the first processor and the second processor through a first queue, and a second queue having a higher priority than the first queue, thereby ensuring real-time transmission of a high priority event during the inter-processor communication.

Meanwhile, the shared memory may transmit speed data or position information data between the first processor and the second processor through the second queue, thereby ensuring real-time transmission of a high priority event during the inter-processor communication.

Meanwhile, the first processor or the second processor may manage a list of applications capable of using the second queue, thereby ensuring real-time transmission of a high priority event during the inter-processor communication.

Meanwhile, in case in which a number of events for the IPC increases, the shared memory may transmit only data, corresponding to events allocated for the second queue, through the second queue, thereby ensuring real-time transmission of a high priority event during the inter-processor communication.

Meanwhile, during the IPC, the shared memory may allocate buffers of a size aligned with memory blocks or memory addresses, thereby reducing memory overhead during memory access.

Meanwhile, the shared memory may set a smaller number of buffers than a number of periodic events for the IPC, thereby reducing memory overhead during memory access.

Meanwhile, in response to a request for subscription to preceding vehicle distance information, the second processor may transmit the request for subscription to the preceding vehicle distance information to the first processor, wherein the first processor may receive the preceding vehicle distance information from a radar sensor, and upon receiving the preceding vehicle distance information, the first processor may compare the information with a value stored in the first cache, and in response to a difference therebetween being greater than or equal to a predetermined value, the first processor may store the preceding vehicle distance information in the first cache and may send the value stored in the first cache to the second processor through the IPC. Accordingly, the preceding vehicle distance information may be transmitted while reducing latency during the inter-processor communication.

Meanwhile, through the IPC, the second processor may store the preceding vehicle distance information in the second cache and may transmit the preceding vehicle distance information stored in the second cache to an application which has transmitted the request for subscription to the preceding vehicle distance information. Accordingly, the preceding vehicle distance information may be transmitted while reducing latency during the inter-processor communication.

Meanwhile, in response to a request for subscription to preceding vehicle distance information, the second processor may transmit the request for subscription to the preceding vehicle distance information to the first processor, wherein the first processor may receive the preceding vehicle distance information from a radar sensor, and upon receiving the preceding vehicle distance information, the first processor may compare the information with a value stored in the first cache, and in response to a difference therebetween being less than a predetermined value, the first processor may not store the received preceding vehicle distance information in the first cache and may not transmit the information to the second processor through the IPC. Accordingly, by minimizing buffer occupancy of the same data, the preceding vehicle distance information may be transmitted while reducing latency during the inter-processor communication.

Meanwhile, the signal processing device and the vehicle communication device including the same may further include: a first memory including an IPC channel: and a second memory storing sensor data including vehicle speed data, wherein the shared memory may be provided in the first memory. Accordingly, when the vehicle speed data is transmitted, latency may be reduced and high-speed data transmission may be performed during the inter-processor communication.

Meanwhile, the first processor may implement a message router, wherein the message router may convert a frame of the first message into a frame format of the second message, and may transmit the converted message to the second processor, thereby enabling stable IPC.

DETAILED DESCRIPTION

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1:
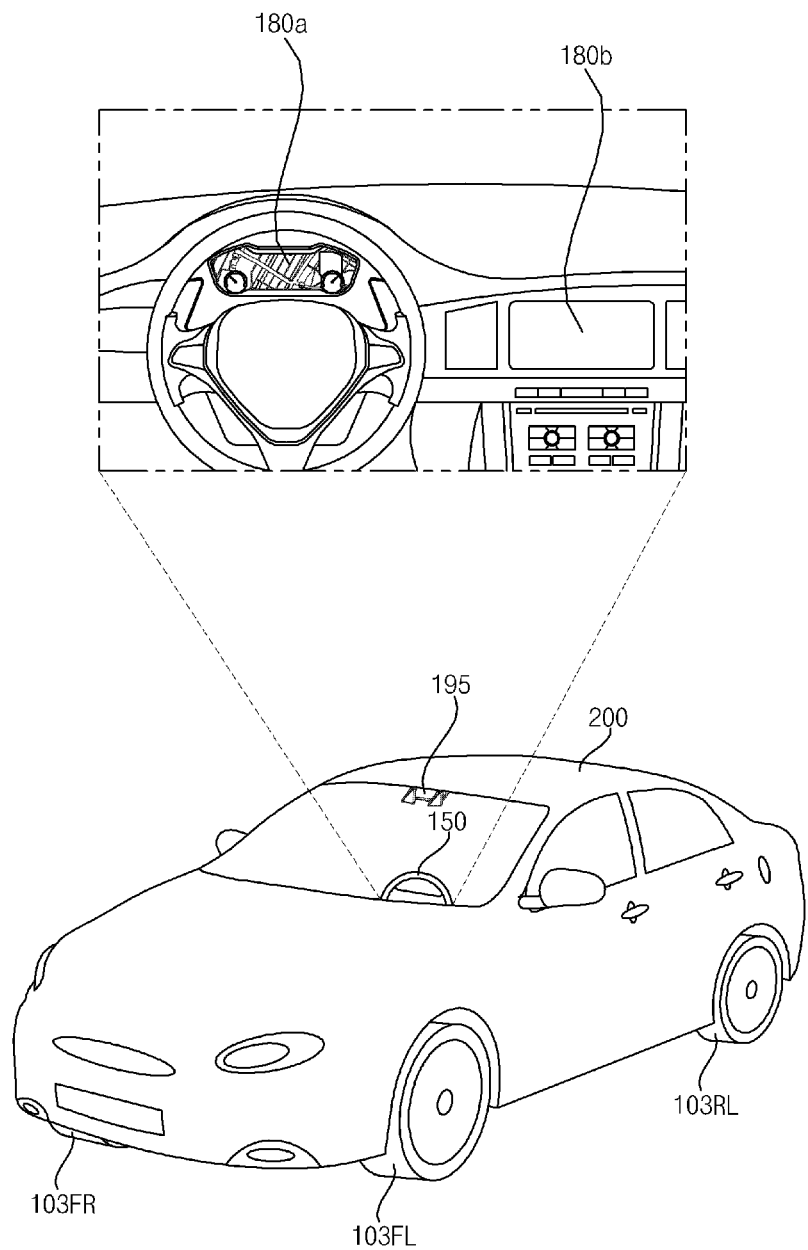
FIG. 1 is a view showing an example of the exterior and interior of a vehicle.

FIG. 1 is a view showing an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a and 180b configured to display images and information.

In FIG. 1, a cluster display 180a and an audio video navigation (AVN) display 180b are illustrated as the plurality of displays 180a and 180b. In addition, a head up display (HUD) may also be used.

Meanwhile, the audio video navigation (AVN) display 180b may also be called a center information display.

Meanwhile, according to the embodiment of the present disclosure, in a vehicle display apparatus 100 including a plurality of displays 180a and 180b, the plurality of displays 180a and 180b may display the same images in a synchronized state.

In particular, a signal processing device 170 in the vehicle display apparatus 100 may transmit the same data to a plurality of virtual machines in a synchronized state, and may be configured to display the same images on the displays.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 2A:
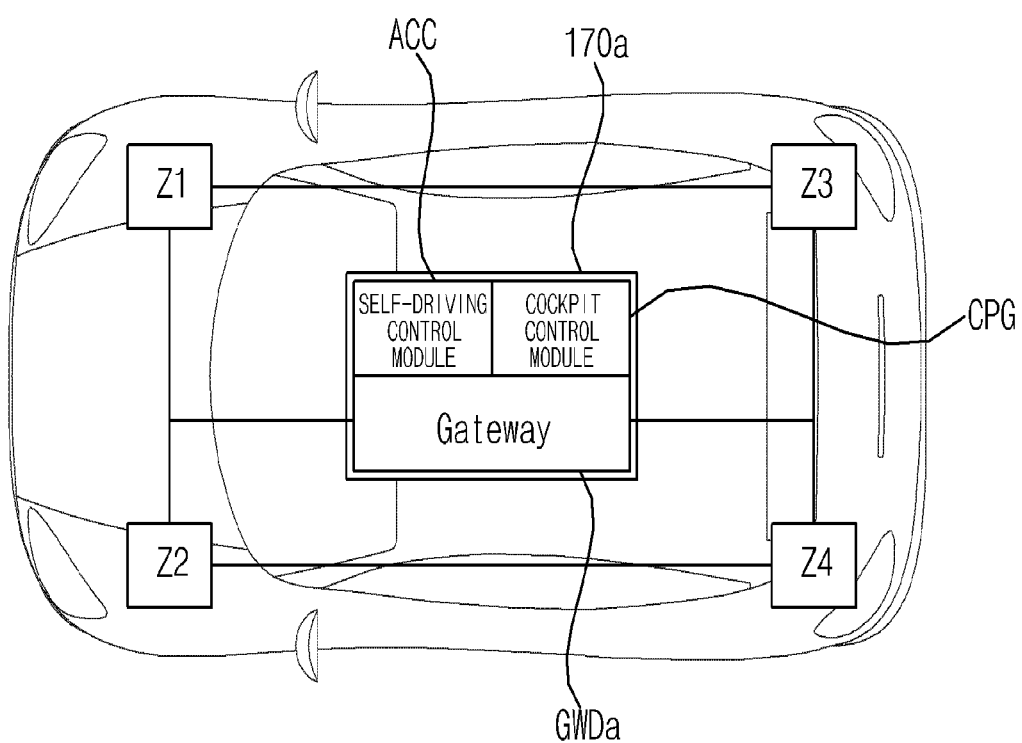
FIGS. 2A to 2C are diagrams illustrating various architectures of a vehicle communication gateway according to an embodiment of the present disclosure.
Figure 2B:
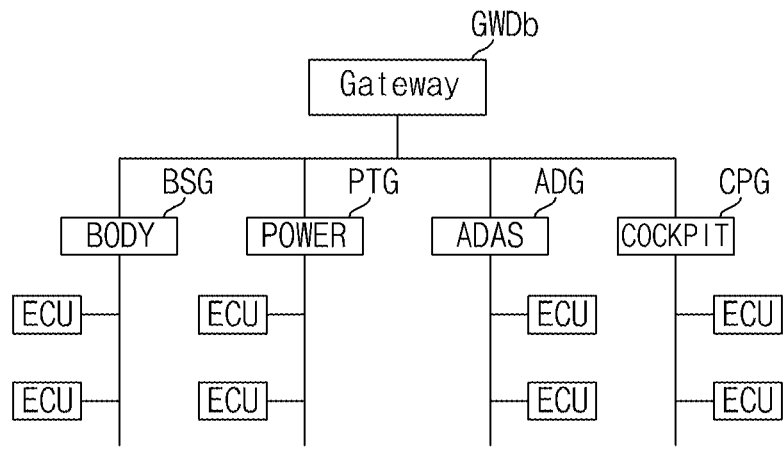
Figure 2C:
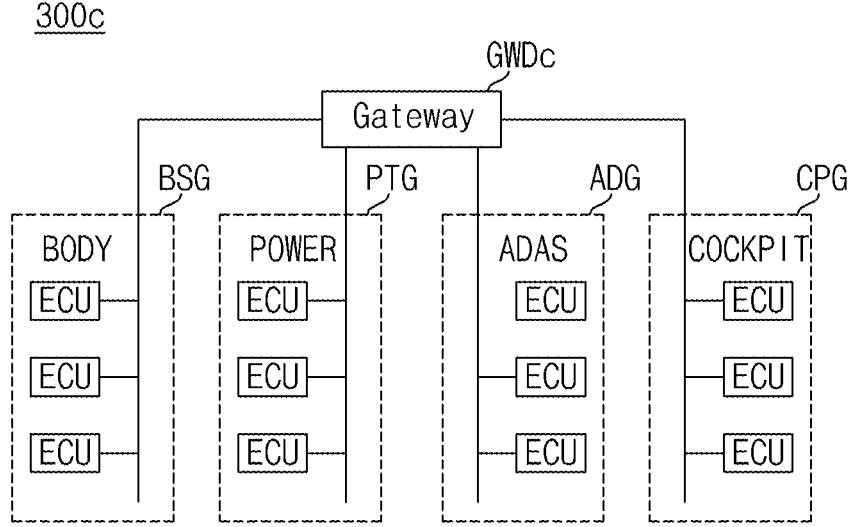

FIGS. 2A to 2C are diagrams illustrating various architectures of a vehicle communication gateway according to an embodiment of the present disclosure.

First, FIG. 2A is a diagram illustrating a first architecture of a vehicle communication gateway according to an embodiment of the present disclosure.

Referring to the drawing, the first architecture 300a may correspond to a zone-based architecture.

Accordingly, in-vehicle sensor devices and processors may be mounted in each of a plurality of zones Z1 to Z4, and a signal processing device 170a including a vehicle communication gateway GWDa may be disposed at the center of the plurality of zones Z1 to Z4.

Meanwhile, the signal processing device 170a may further include a self-driving control module ACC, a cockpit control module CPG, etc., in addition to the vehicle communication gateway GWDa.

The vehicle communication gateway GWDa in the signal processing device 170a may be a High Performance Computing (HPC) gateway.

That is, as an integrated HPC gateway, the signal processing device 170a of FIG. 2A may exchange data with an external communication module (not shown) or processors (not shown) in the plurality of zones Z1 to Z4.

FIG. 2B is a diagram illustrating a second architecture of a vehicle communication gateway according to an embodiment of the present disclosure.

Referring to the drawing, a second architecture 300b may correspond to a domain integrated architecture.

Accordingly, a body chassis control module (BSG), a power control module (PTG), an ADAS control module (ADG), and a cockpit control module (CPG) are connected in parallel to a gateway GWDb, and a plurality of processors ECU may be electrically connected to the respective modules BSG, PTG, ADG, and CPG.

Meanwhile, the respective processors ECU may be connected to the gateway GWDb while being integrated therein.

Meanwhile, the signal processing device 170 including the gateway GWDb of FIG. 2B may function as a domain integrated signal processing device.

FIG. 2C is a diagram illustrating a third architecture of a vehicle communication gateway according to an embodiment of the present disclosure.

Referring to the drawing, a third architecture 300c may correspond to a distributed architecture.

Accordingly, the body chassis control module (BSG), the power control module (PTG), the ADAS control module (ADG), and the cockpit control module (CPG) are connected in parallel to a gateway GWDc, and particularly a plurality of processors ECU in the respective control modules may be electrically connected in parallel to the gateway GWDc.

Upon comparison with FIG. 2B, the third architecture has a difference in that the respective processors ECU are connected directly to the gateway GWDc without being connected to another module.

Meanwhile, the signal processing device 170 including the gateway GWDc of FIG. 2C functions as a distributed signal processing device.

Figure 3:
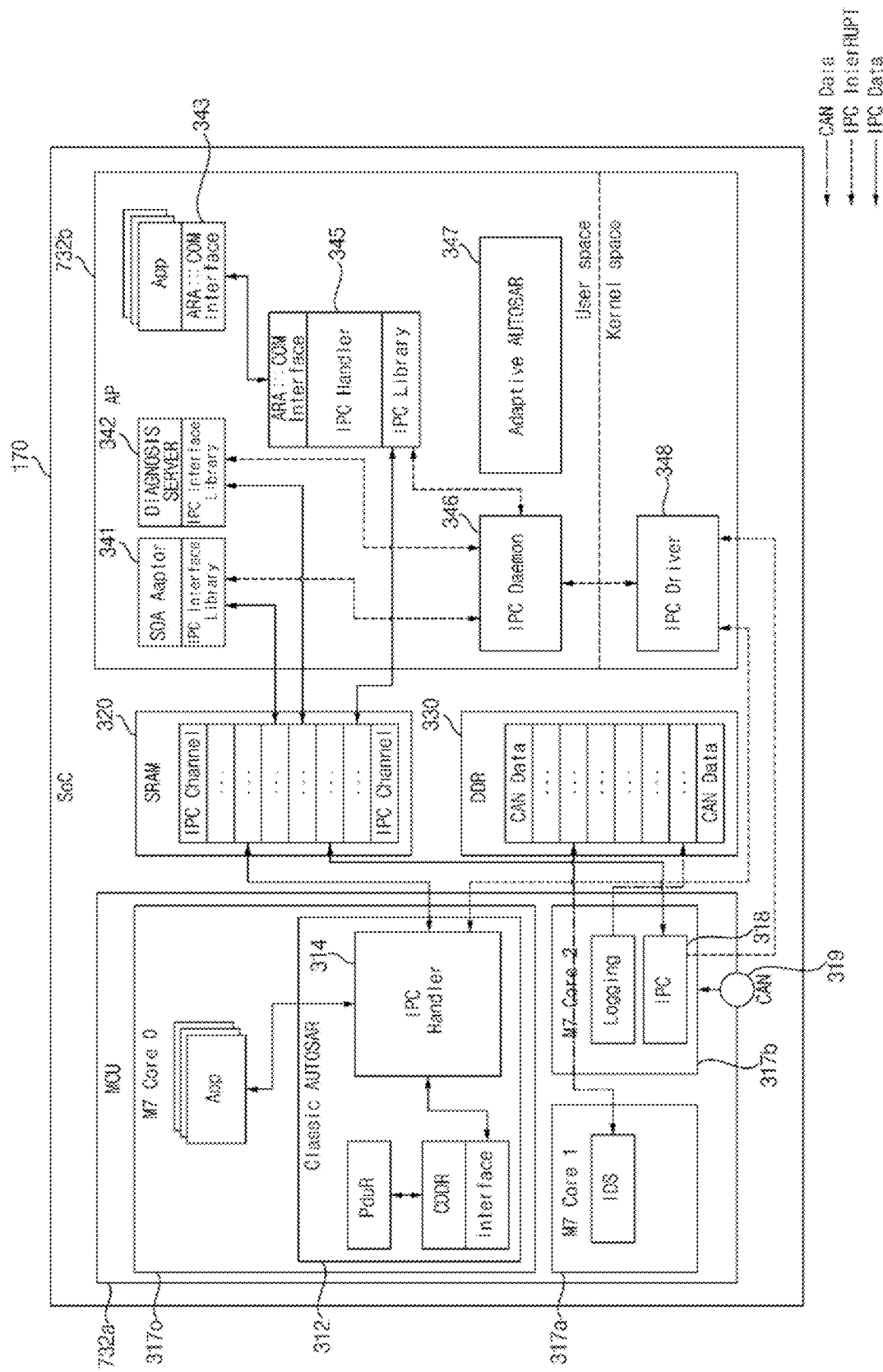
FIG. 3 is an internal block diagram illustrating a signal processing device according to an embodiment of the present disclosure.

FIG. 3 is an internal block diagram illustrating a signal processing device according to an embodiment of the present disclosure.

Referring to the drawing, the signal processing device 170 according to an embodiment of the present disclosure includes: a first processor 732a, which based on a first communication scheme, is configured to receive a first message including a sensor signal in a vehicle and to perform signal processing on the received first message; and a second processor 732b, which based a second communication scheme, is configured to receive a second message including a communication message received from an external source and to perform signal processing of the received second message.

In this case, the second communication scheme may have a faster communication speed or a wider bandwidth than the first communication scheme.

For example, the second communication scheme may be Ethernet communication, and the first communication scheme may be CAN communication. Accordingly, the first message may be a CAN message, and the second message may be an Ethernet message.

Meanwhile, the signal processing device 170 according to an embodiment of the present disclosure further includes: a first memory 320 having an IPC channel; and a second memory 330 storing sensor data including vehicle speed data.

For example, the first memory 320 may be a Static RAM (SRAM), and the second memory 330 may be a DDR memory. Particularly, the second memory 330 may be a Double data rate synchronous dynamic random access memory (DDR SDRAM).

Meanwhile, the signal processing device 170 according to an embodiment of the present disclosure includes a shared memory 508 which operates for transmitting the first message or the second message between the first processor 732a and the second processor 732b.

As described above, by performing inter-processor communication using the shared memory 508 during the communication between the first processor 732a and the second processor 732b, latency may be reduced and high-speed data transmission may be performed during inter-processor communication.

Meanwhile, it is desired that the shared memory 508 is provided in the first memory 320. Accordingly, latency may be reduced and high-speed data transmission may be performed during inter-processor communication.

Meanwhile, the first processor 732a may include a plurality of processor cores 317o, 317a, and 317b disposed therein.

Meanwhile, the first processor 732a may further include an interface 319 for receiving the CAN message from external vehicle sensors.

For example, a first processor core 317o included in the first processor 732a may execute a plurality of applications or may execute a first AUTomotive Open System Architecture (AUTOSAR) 312.

Particularly, by executing a second AUTOSAR 312, the first processor core 317o may execute an inter-processor communication (IPC) handler 314.

Meanwhile, the IPC handler 314 may exchange data with the first memory 320 or may exchange IPC data with an application running on the core 317o.

Meanwhile, the IPC handler 314 may exchange an interrupt signal with an IPC driver 348 included in the second processor 732b.

Meanwhile, a second processor core 317a included in the first processor 732a may execute IDS and may receive CAN data from the second memory 330.

Meanwhile, a third core 317b included in the first processor 732a may execute Logging, and may store the CAN data, received through the interface 319, in the second memory 330.

Meanwhile, the third processor core 317b included in the first processor 732a may execute an IPC module 318 to exchange IPC data with the first memory 320.

Meanwhile, the third processor core 317b included in the first processor 732a may transmit an interrupt signal to the IPC driver 348 in the second processor 732b.

The first memory 320 may exchange the IPC data with the IPC handler 314 or the IPC module 318.

Meanwhile, the second processor 732b may execute an application 343, the IPC handler 345, an IPC daemon 346, the IPC driver 348, and the like.

Meanwhile, the second processor 732b may further execute a service oriented architecture (SOA) adapter 341, a diagnosis server 342, and the second AUTOSAR 347.

The second AUTOSAR 347 may be an adaptive AUTOSAR, and the first AUTOSAR 312 may be a classic AUTOSAR.

The IPC daemon 346 may exchange an interrupt signal with the SOA adapter 341, the diagnosis server 342, the IPC handler 345, the IPC driver 348, and the like.

Meanwhile, the first memory 320 may exchange IPC data with the SOA adapter 341, the diagnosis server 342, the IPC handler 345, and the like.

Meanwhile, the IPC data described with reference to FIG. 3 may be the CAN message or Ethernet message.

Meanwhile, the IPC handler 345 may function as a service provider providing data such as diagnosis, firmware, upgrade, system information, etc., based on the second AUTOSAR 347.

Meanwhile, although not illustrated in FIG. 3, the first processor 732a implements a message router (not shown), and the message router may convert a frame of the first message, such as the CAN message, into a frame format of the second message, such as the Ethernet message, and may transmit the converted message to the second processor 732b.

Meanwhile, although not illustrated in FIG. 3, the first processor 732a may further implement a CAN driver (not shown) and a CAN interface (not shown).

For example, the CAN interface (not shown) may be implemented by a total of 16 channels, with eight channels of each of a fourth processor core (not shown) and a fifth processor core (not shown) in the first processor 732a.

In this case, a first CAN interface (not shown) implemented on the fourth processor core (not shown) may correspond to a first queue (PTb) during inter-processor communication, and a second CAN interface (not shown) implemented on the fifth processor core (not shown) may correspond to a second queue (PTb), having a higher priority than the first queue (PTb), during inter-processor communication.

Figure 4A:
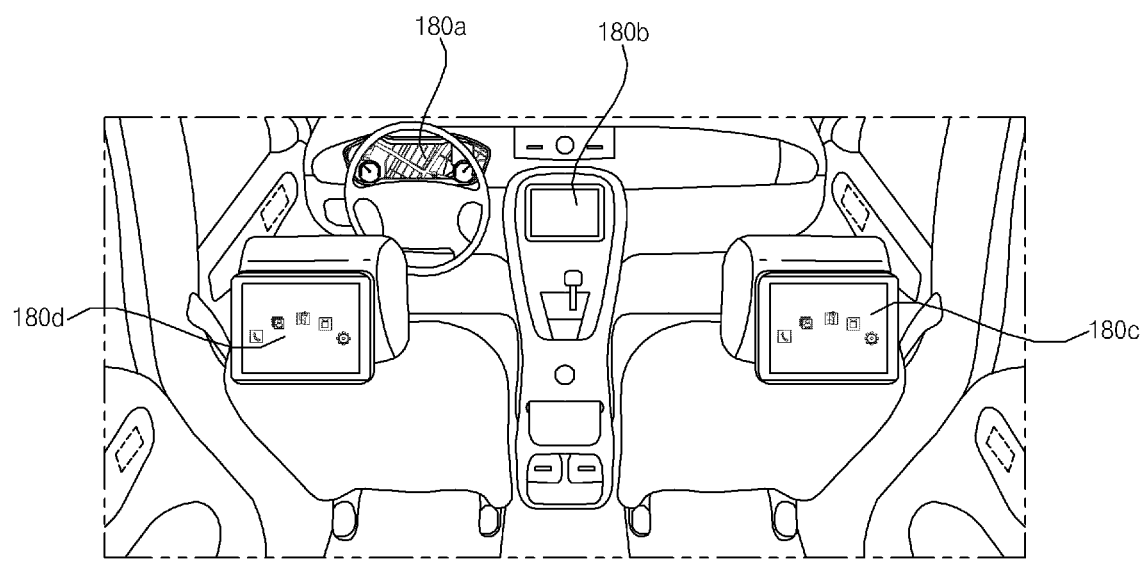
FIG. 4A is a diagram illustrating an example of an arrangement of a vehicle display apparatus in a vehicle according to an embodiment of the present disclosure.

FIG. 4A is a diagram illustrating an example of an arrangement of a vehicle display apparatus in a vehicle according to an embodiment of the present disclosure.

Referring to the figure, a cluster display 180a, an audio video navigation (AVN) display 180b, rear seat entertainment displays 180c and 180d, and a rear-view mirror display (not shown) may be mounted in the vehicle.

Figure 4B:
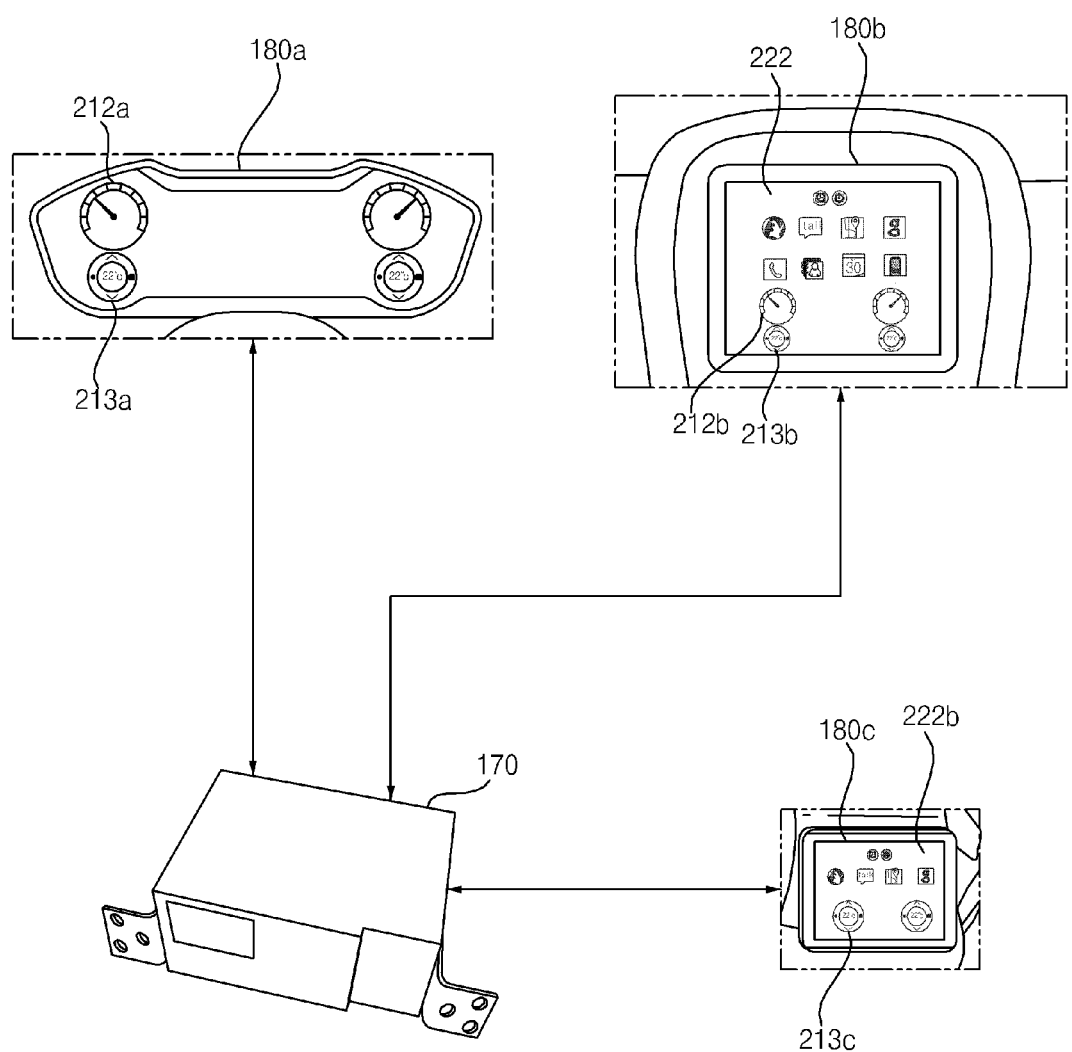
FIG. 4B is a diagram illustrating another example of an arrangement of a vehicle display apparatus in a vehicle according to an embodiment of the present disclosure.

FIG. 4B is a diagram illustrating another example of an arrangement of a vehicle display apparatus in a vehicle according to an embodiment of the present disclosure.

The vehicle display apparatus 100 according to the embodiment of the present disclosure may include a plurality of displays 180a and 180b and a signal processing device 170 configured to perform signal processing in order to display images and information on the plurality of displays 180a and 180b.

The first display 180a, which is one of the plurality of displays 180a and 180b, may be a cluster display 180a configured to display a driving state and operation information, and the second display 180b may be an audio video navigation (AVN) display 180b configured to display vehicle driving information, a navigation map, various kinds of entertainment information, or an image.

The signal processing device 170 may have a processor 175 provided therein, and first to third virtual machines (not shown) may be executed by a hypervisor 505 in the processor 175.

The second virtual machine (not shown) may be operated for the first display 180a, and the third virtual machine (not shown) may be operated for the second display 180b.

Meanwhile, the first virtual machine (not shown) in the processor 175 may be configured to set a shared memory 508 based on the hypervisor 505 for transmission of the same data to the second virtual machine (not shown) and the third virtual machine (not shown). Consequently, the first display 180a and the second display 180b in the vehicle may display the same information or the same images in a synchronized state.

Meanwhile, the first virtual machine (not shown) in the processor 175 shares at least some of data with the second virtual machine (not shown) and the third virtual machine (not shown) for divided processing of data. Consequently, the plurality of virtual machines for the plurality of displays in the vehicle may divide and process data.

Meanwhile, the first virtual machine (not shown) in the processor 175 may receive and process wheel speed sensor data of the vehicle, and may transmit the processed wheel speed sensor data to at least one of the second virtual machine (not shown) or the third virtual machine (not shown). Consequently, at least one virtual machine may share the wheel speed sensor data of the vehicle.

Meanwhile, the vehicle display apparatus 100 according to the embodiment of the present disclosure may further include a rear seat entertainment (RSE) display 180c configured to display driving state information, simple navigation information, various kinds of entertainment information, or an image.

The signal processing device 170 may further execute a fourth virtual machine (not shown), in addition to the first to third virtual machines (not shown), on the hypervisor 505 in the processor 175 to control the RSE display 180c.

Consequently, it is possible to control various displays 180a to 180c using a single signal processing device 170.

Meanwhile, some of the plurality of displays 180a to 180c may be operated based on a Linux Operating System (OS), and others may be operated based on a Web Operating System (OS).

The signal processing device 170 according to the embodiment of the present disclosure may be configured to display the same information or the same images in a synchronized state on the displays 180a to 180c to be operated under various operating systems.

Meanwhile, FIG. 4B illustrates that a vehicle speed indicator 212a and an in-vehicle temperature indicator 213a are displayed on the first display 180a, a home screen 222 including a plurality of applications, a vehicle speed indicator 212b, and an in-vehicle temperature indicator 213b is displayed on the second display 180b, and a second home screen 222b including a plurality of applications and an in-vehicle temperature indicator 213c is displayed on the third display 180c.

Figure 5:
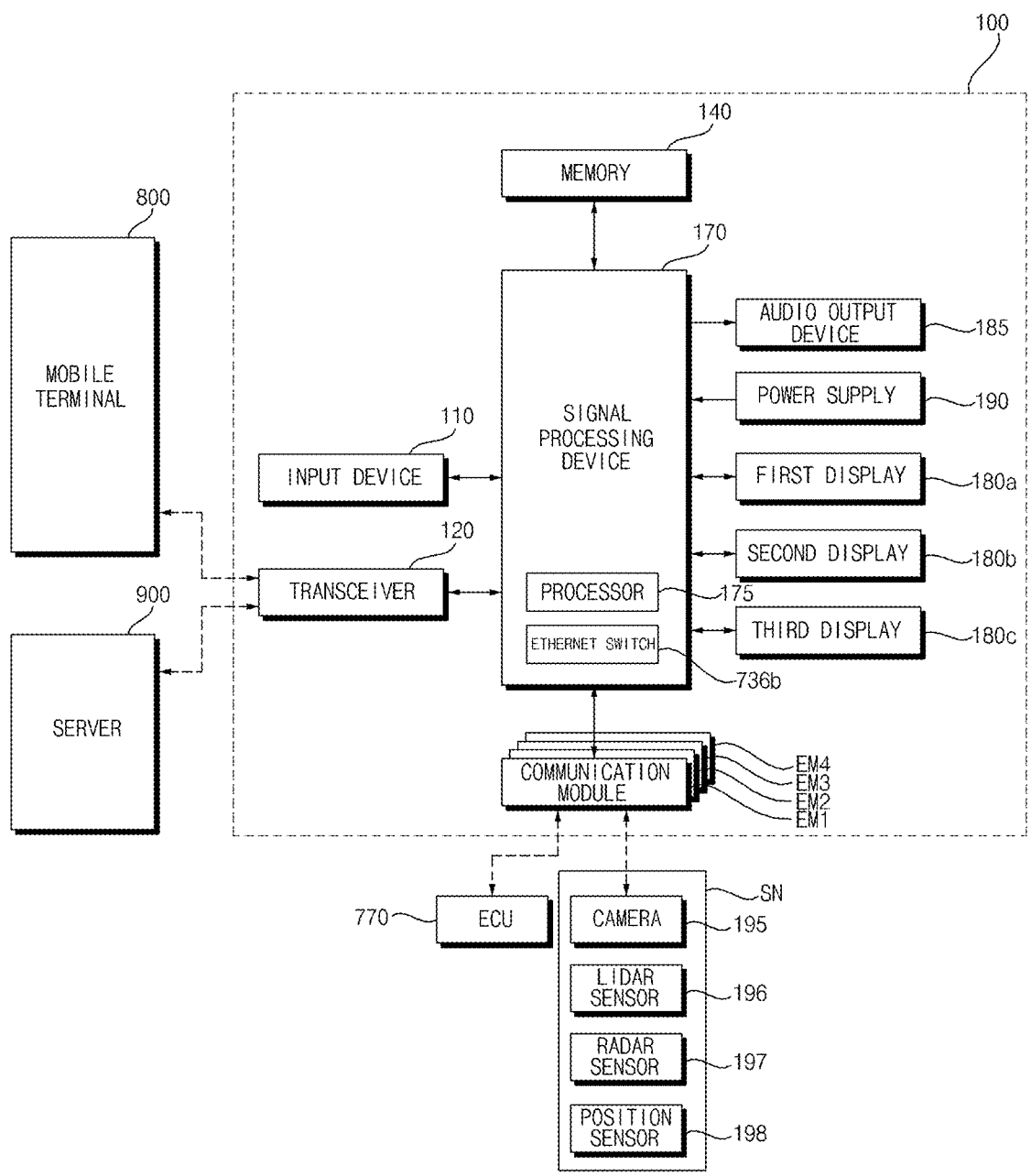
FIG. 5 is an internal block diagram illustrating the vehicle display apparatus of FIG. 4B.

FIG. 5 is an internal block diagram illustrating the vehicle display apparatus of FIG. 4B according to the embodiment of the present disclosure.

Referring to the figure, the vehicle display apparatus 100 according to the embodiment of the present disclosure may include an input device 110, a transceiver 120 for communication with an external device, a plurality of communication modules EM1 to EM4 for internal communication, a memory 140, a signal processing device 170, a plurality of displays 180a to 180c, an audio output device 185, and a power supply 190.

The plurality of communication modules EM1 to EM4 may be disposed in a plurality of zones Z1 to Z4, respectively, in FIG. 2A.

The plurality of communication modules EMa to EMd may be disposed in a plurality of zones Z1 to Z4, respectively, in FIG. 2A.

Meanwhile, the signal processing device 170 may be provided therein with an Ethernet switch 736b for data communication with the respective communication modules EM1 to EM4.

The respective communication modules EM1 to EM4 may perform data communication with a plurality of sensor devices SN or an ECU 770.

Meanwhile, each of the plurality of sensor devices SN may include a camera 195, a lidar sensor 196, a radar sensor 197, or a position sensor 198.

The input device 110 may include a physical button or pad for button input or touch input.

Meanwhile, the input device 110 may include a microphone (not shown) for user voice input.

The transceiver 120 may wirelessly exchange data with a mobile terminal 800 or a server 900.

In particular, the transceiver 120 may wirelessly exchange data with a mobile terminal of a vehicle driver. Any of various data communication schemes, such as Bluetooth, Wi-Fi, WIFI Direct, and APIX, may be used as a wireless data communication scheme.

The transceiver 120 may receive weather information and road traffic situation information, such as transport protocol expert group (TPEG) information, from the mobile terminal 800 or the server 900. To this end, the transceiver 120 may include a mobile communication module (not shown).

The plurality of communication modules EM1 to EM4 may receive sensor information from an electronic control unit (ECU) 770 or a sensor device SN, and may transmit the received information to the signal processing device 170.

Here, the sensor information may include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, and in-vehicle humidity information.

The sensor information may be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor.

Meanwhile, the position module may include a GPS module configured to receive GPS information or a position sensor 198.

Meanwhile, at least one of the plurality of communication modules EM1 to EM4 may transmit position information data sensed by the GPS module or the position sensor 198 to the signal processing device 170.

Meanwhile, at least one of the plurality of communication modules EM1 to EM4 may receive front-of-vehicle image data, side-of-vehicle image data, rear-of-vehicle image data, and obstacle-around-vehicle distance information from the camera 195, the lidar sensor 196, or the radar sensor 197, and may transmit the received information to the signal processing device 170.

The memory 140 may store various data necessary for overall operation of the vehicle display apparatus 100, such as programs for processing or control of the signal processing device 170.

For example, the memory 140 may store data about the hypervisor and first to third virtual machines executed by the hypervisor in the processor 175.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the vehicle display apparatus 100.

For example, the signal processing device 170 may include a processor 175 configured to perform signal processing for the vehicle displays 180a and 180b.

The processor 175 may execute the first to third virtual machines (not shown) on the hypervisor 505 (see FIG. 10) in the processor 175.

Among the first to third virtual machines (not shown) (see FIG. 10), the first virtual machine (not shown) may be called a server virtual machine, and the second and third virtual machines (not shown) and (not shown) may be called guest virtual machines.

For example, the first virtual machine (not shown) in the processor 175 may receive sensor data from the plurality of sensor devices, such as vehicle sensor data, position information data, camera image data, audio data, or touch input data, and may process and output the received sensor data.

As described above, the first virtual machine (not shown) may process most of the data, whereby 1:N data sharing may be achieved.

In another example, the first virtual machine (not shown) may directly receive and process CAN data, Ethernet data, audio data, radio data, USB data, and wireless communication data for the second and third virtual machines (not shown).

Further, the first virtual machine (not shown) may transmit the processed data to the second and third virtual machines (not shown).

Accordingly, only the first virtual machine (not shown), among the first to third virtual machines (not shown), may receive sensor data from the plurality of sensor devices, communication data, or external input data, and may perform signal processing, whereby load in signal processing by the other virtual machines may be reduced and 1:N data communication may be achieved, and therefore synchronization at the time of data sharing may be achieved.

Meanwhile, the first virtual machine (not shown) may be configured to write data in the shared memory 508, whereby the second virtual machine (not shown) and the third virtual machine (not shown) share the same data.

For example, the first virtual machine (not shown) may be configured to write vehicle sensor data, the position information data, the camera image data, or the touch input data in the shared memory 508, whereby the second virtual machine (not shown) and the third virtual machine (not shown) share the same data. Consequently, 1:N data sharing may be achieved.

Eventually, the first virtual machine (not shown) may process most of the data, whereby 1:N data sharing may be achieved.

Meanwhile, the first virtual machine (not shown) in the processor 175 may be configured to set the shared memory 508 based on the hypervisor 505 in order to transmit the same data to the second virtual machine (not shown) and the third virtual machine (not shown).

Meanwhile, the signal processing device 170 may process various signals, such as an audio signal, an image signal, and a data signal. To this end, the signal processing device 170 may be implemented in the form of a system on chip (SOC).

Figure 7:
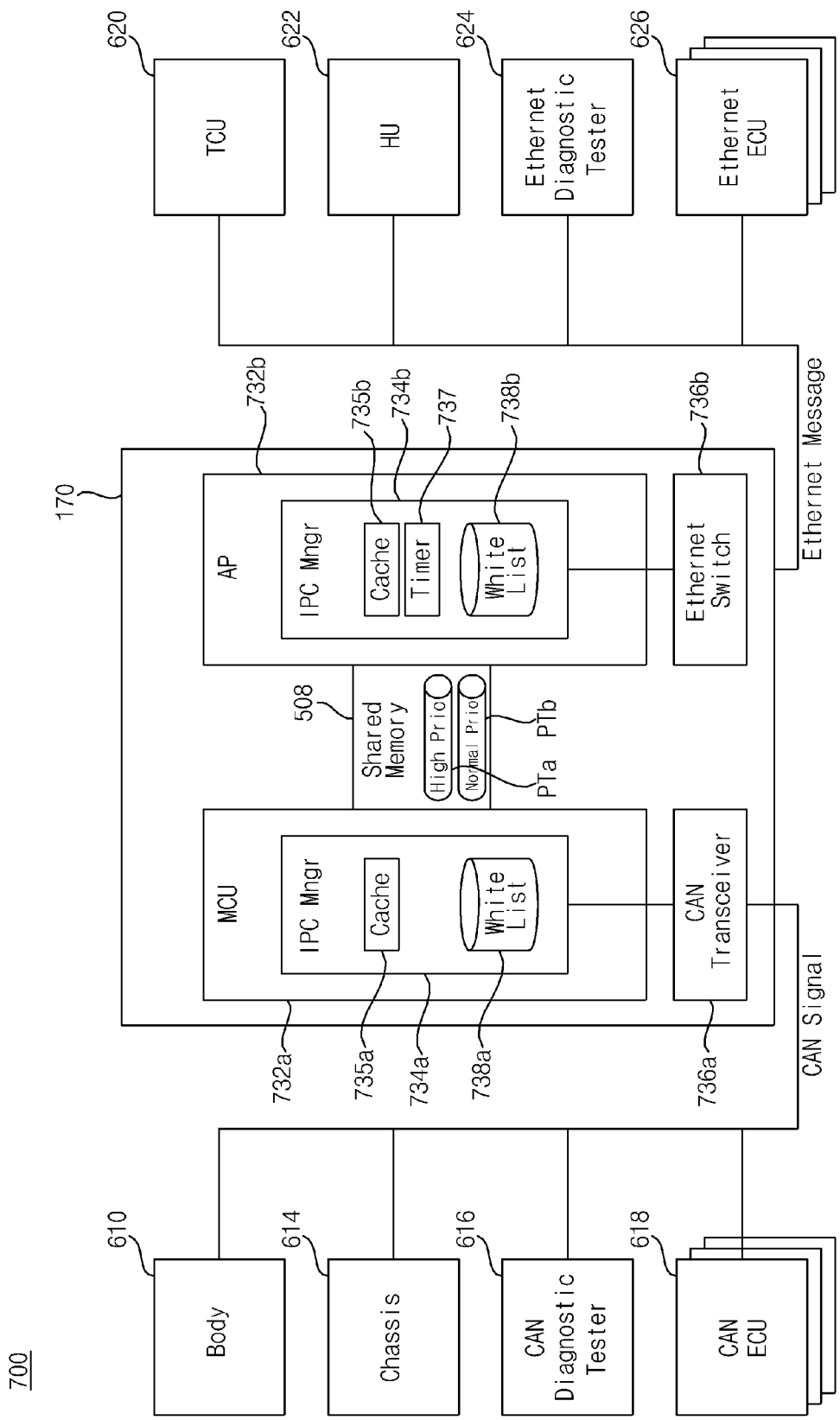
FIG. 7 is an internal block diagram illustrating a vehicle communication device according to an embodiment of the present disclosure.

Meanwhile, the signal processing device 170 included in the display apparatus 100 of FIG. 5 may be the same as the signal processing device 170 of a vehicle communication device 700 of FIG. 7 and the like.

Figure 6:
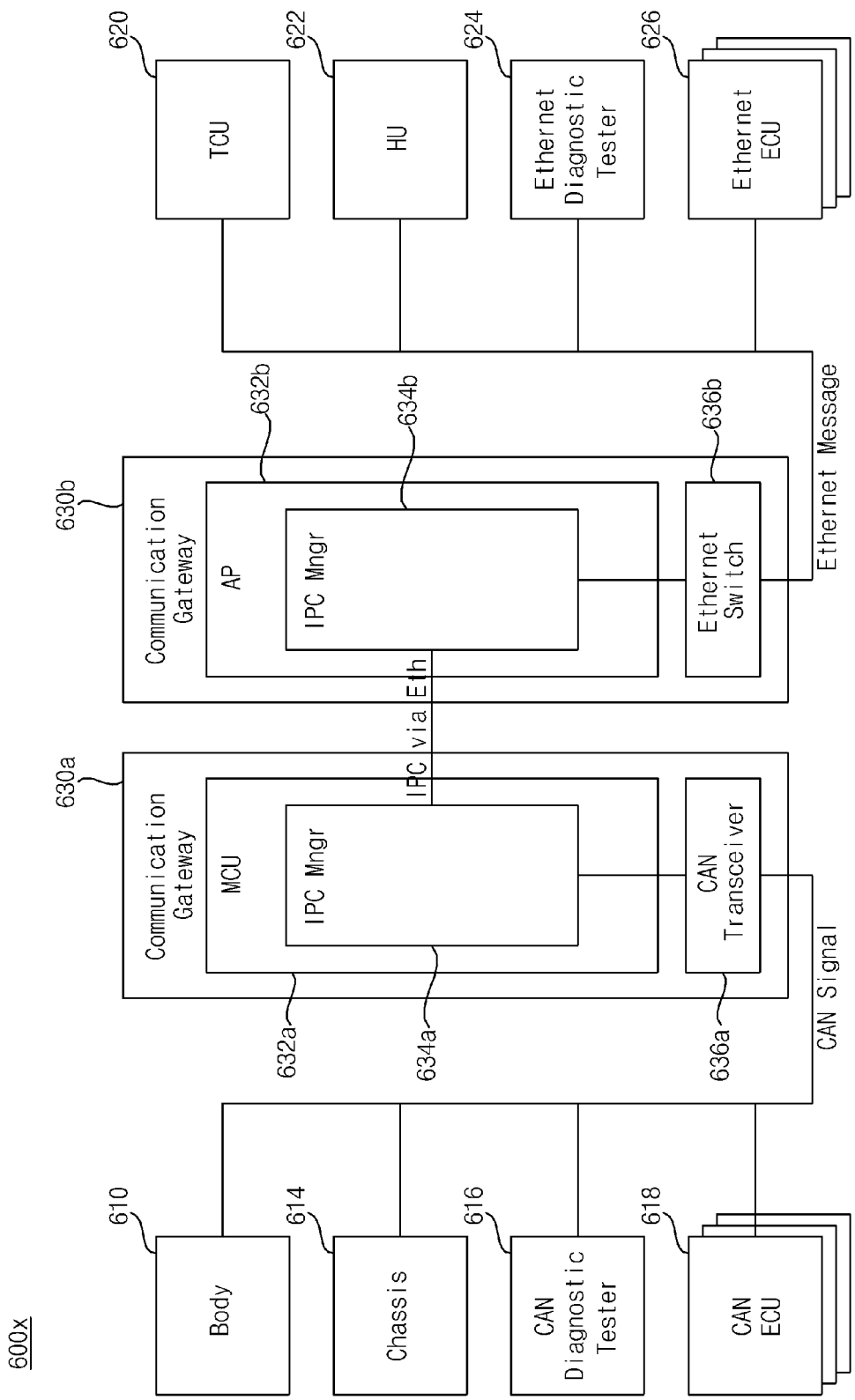
FIG. 6 is an internal block diagram illustrating a vehicle communication device associated with the present disclosure.

FIG. 6 is an internal block diagram illustrating a vehicle communication device associated with the present disclosure.

Referring to the drawing, a vehicle communication device 600x associated with the present disclosure may include a first communication gateway 630a and a second communication gateway 630b.

The first communication gateway 630a may include a body module 610, a chassis module 614, a CAN diagnostic tester 616, a CAN transceiver 636a for exchanging a CAN signal by CAN communication with at least one CAN ECU 618 and the like, and a first processor 632a for performing signal processing on the CAN signal received from the CAN transceiver 636a.

Meanwhile, the first processor 632a may include an IPC manager 634a for inter-processor communication with a second processor 632b in the second communication gateway 630b.

The second communication gateway 630b may include a telematics control module 620, a head module 622, an Ethernet diagnostic tester 624, an Ethernet switch 636b for exchanging an Ethernet message by Ethernet communication with at least one Ethernet ECU 626, and a second processor 632b for performing signal processing on the Ethernet message received from the Ethernet switch 636b.

Meanwhile, the second processor 632b may include an IPC manager 634b for inter-processor communication with the first processor 632a in the first communication gateway 630a.

Meanwhile, the IPC manager 634a in the first processor 632a and the IPC manager 643b in the second processor 632b may perform inter-processor communication based on the Ethernet communication.

While the inter-processor communication is suitable for high-speed transmission of large data using a high bandwidth based on Ethernet, the communication method has a drawback in that latency occurs in communication between a protocol stack and a Physical Layer (PHY).

Accordingly, the present disclosure provides a method of reducing latency and performing high-speed data transmission during inter-processor communication, which will be described below with reference to FIG. 7 and the following figures.

FIG. 7 is an internal block diagram illustrating a vehicle communication device according to an embodiment of the present disclosure.

Referring to the drawing, the vehicle communication device 700 according to an embodiment may include: a first processor 732a, which based on a first communication scheme along with a first communication gateway 730a and a second communication gateway 730b, is configured to receive a first message including a sensor signal in a vehicle and to perform signal processing on the received first message: a second processor 732b, which based a second communication scheme, is configured to receive a second message including a communication message received from an external source and to perform signal processing of the received second message: and a shared memory 508 configured to operate to transmit the first message or the second message between the first processor 732a and the second processor 732b.

In comparison with the communication device 600x of FIG. 6, by using the shared memory 508 for inter-processor communication (IPC) between the first processor 732a and the second processor 732b, it is possible to reduce latency and to perform high-speed data transmission during the inter-processor communication.

In addition, in comparison with the communication device 600x of FIG. 6, by providing the first processor 732a, the second processor 732b, and the shared memory 508 in one signal processing device 170 implemented as a single chip, it is possible to reduce latency and to perform high-speed data transmission during the inter-processor communication.

Meanwhile, it is preferred that the second communication scheme has a faster communication speed or a wider bandwidth than the first communication scheme.

For example, the second communication scheme may be Ethernet communication, and the first communication scheme may be CAN communication. Accordingly, the first message may be a CAN message, and the second message may be an Ethernet message.

Meanwhile, the signal processing device 170 and the vehicle communication device 700 including the same according to an embodiment of the present disclosure may further include: a transceiver 736a, which based on the first communication scheme, is configured to receive a first message including a sensor signal in a vehicle and to transmit the first message to the first processor 732a; and the switch 736b, which based on the second communication scheme, is configured to receive a second message including a communication message received from an external source, and to transmit the second message to the second processor 732b, such that the first and second messages may be transmitted stably to the first processor 732a and the second processor 732b.

The first processor 732a or the transceiver 736a may exchange a CAN signal by CAN communication with the body module 610, the chassis module 614, the CAN diagnostic tester 616, at least one CAN ECU 618, and the like.

Meanwhile, the first processor 732a may include a first manager 734a for inter-processor communication (IPC) with the second processor 732b. The first manager 734a may be referred to as an IPC manager.

Meanwhile, the first manager 734a may include a first cache 735a.

Meanwhile, the second processor 732b or the switch 736b may exchange an Ethernet message by Ethernet communication with the telematics control module 620, the head module 622, the Ethernet diagnostic tester 624, at least one Ethernet ECU 626, and the like. The switch 736b may be referred to as an Ethernet switch.

Meanwhile, the second processor 732b may include a second manager 734b for inter-processor communication (IPC) with the first processor 732a. The second manager 734a may be referred to as an IPC manager.

Meanwhile, the second manager 734b may include the second manager 734b including a second cache 735b and a timer 737.

Meanwhile, the second processor 723b may receive a request for periodic subscription to the first message from the Ethernet processor or the Ethernet ECU 626.

Accordingly, the second processor 732b may send the request for periodic subscription to the first message to the first processor 732a.

Particularly, the second processor 732b may transmit the subscription request through the inter-processor communication (IPC). Accordingly, the inter-processor communication may be performed.

Meanwhile, the first processor 732a may periodically receive CAN data from the at least one CAN ECU 618 and the like.

For example, the first processor 732a periodically receives the first message, predefined in a CAN database (DB), from the at least one CAN ECU 618 and the like.

For example, the periodic first message, which is sensor information, may include vehicle speed information, position information, or the like.

In another example, the periodic first message may include at least one of vehicle direction information, vehicle position information (GPS information), vehicle angle information, vehicle acceleration information, vehicle tilt information, forward/backward movement information, battery information, fuel information, tire information, vehicle lamp information, in-vehicle temperature information, and in-vehicle humidity information.

Meanwhile, the first processor 732a may select a first message, for which the subscription is requested, among the periodically received CAN data or first messages, and may transmit the first message, for which the subscription is requested, to the second processor 732b.

Meanwhile, the first processor 732a may separately process a first message, for which the subscription is not requested, among the periodically received CAN data or first messages, without transmitting the message to the second processor 732b.

Specifically, upon receiving the first message for which the subscription is requested, the first processor 732a may store the first message in the first cache 735a or may manage the first message. Upon receiving the first message, the first processor 732a may compare the first message with a value stored in the first cache 735a, and if a difference therebetween is greater than or equal to a predetermined value, the first processor 732a may transmit the first message to the second processor 732b through the inter-processor communication.

Meanwhile, upon receiving the first message for which the subscription is requested, the first processor 732a may store the first message in the first cache 735a or may manage the first message. Upon receiving the first message, the first processor 732a may compare the first message with a value stored in the first cache 735a, and if a difference therebetween is greater than or equal to a predetermined value, the first processor 732a may transmit the first message to the second processor 732b through the inter-processor communication using the shared memory 508.

For example, upon receiving the first message, the first processor 732a may compare the message with a value stored in the first cache 735a, and if the two are not the same, the first processor 732a may transmit the first message to the second processor 732b through the inter-processor communication using the shared memory 508.

In another example, upon receiving the first message, the first processor 732a may compare the message with the value stored in the first cache 735a, and if the two are the same, the first processor 732*a* may not transmit the first message to the second processor 732*b*.

Accordingly, by minimizing cache occupancy or buffer occupancy of the same data, it is possible to reduce latency and to perform high-speed data transmission during inter-processor communication.

Meanwhile, upon first receiving the first message, the second processor 732*b* may store the first message in the second cache 735*b*, and upon subsequently receiving the first message, the second processor 732*b* may update the second cache 735*b*. Accordingly, it is possible to reduce latency and to perform high-speed data transmission during inter-processor communication.

Meanwhile, upon receiving the first message, the second processor 732*b* may generate a thread of the timer 737, and each time the thread terminates, the second processor 732*b* may send a value in the second cache 735*b* to the Ethernet processor or the Ethernet ECU 626. Accordingly, it is possible to reduce latency and to perform high-speed data transmission during inter-processor communication.

Meanwhile, during a period in which the inter-processor communication is not performed such that the first message is not received, the second processor 732*b* may send a value in the second cache 735*b* to the Ethernet processor or the Ethernet ECU 626.

That is, if a value of the subscribed first message is constant during the period, the cache value stored in the second processor 732*b* may be sent to the Ethernet processor 626 without the inter-processor communication.

Accordingly, it is possible to minimize the usage of the IPC buffer in the shared memory 508 which operates in FIFO mode. In addition, by maintaining the usage of the IPC buffer to a minimum, data including the first message, the second message, or the like may be transmitted rapidly through the inter-processor communication.

Meanwhile, during a period in which the inter-processor communication is performed such that the first message is received, the second processor 732*b* may send a value in the updated second cache 735*b* to the Ethernet processor or the Ethernet ECU 626. Accordingly, it is possible to reduce latency and to perform high-speed data transmission during inter-processor communication.

Meanwhile, during the inter-processor communication, the shared memory 508 may transmit data between the first processor 732*a* and the second processor 732*b* through a first queue PTb and a second queue PTa having a higher priority than the first queue PTb.

Particularly, even when the number of events for the inter-processor communication increases, the shared memory 508 may transmit only the data, corresponding to events allocated for the second queue PTa, through the second queue PTa. Accordingly, real-time transmission of a high priority event may be ensured during the inter-processor communication.

For example, the first PTb may be a normal priority queue, and the second queue PTa may be a high priority queue.

Specifically, the shared memory 508 may transmit most of the data through the first queue PTb during the inter-processor communication.

However, the share memory 508 may transmit only time sensitive-critical data without delay through the second queue PTa which is a higher priority queue than the first queue PTb.

For example, the time sensitive-critical data may be speed data, position information data, or the like.

That is, the shared memory 508 may transmit the speed data or position information data between the first processor 732*a* or the second processor 732*b* through the second queue PTa. Accordingly, real-time transmission of the speed data or the position information data having a high priority may be ensured during the inter-processor communication.

Meanwhile, the first processor 732*a* or the second processor 732*b* may manage a list of applications capable of using the second queue PTa.

For example, the second processor 732*b* may include an application for displaying speed information, as an application capable of using the second queue PTa, in a second list 738*b* and may manage the list.

Meanwhile, for real-time transmission through the second queue PTa, a minimum operation is preferred so that there may be no redundant scenarios or applications.

As described above, by transmitting the time sensitive-critical data in real time using the second queue PTa, real-time transmission of a high priority event may be ensured during the inter-processor communication.

Meanwhile, during the inter-processor communication, the shared memory 508 may reduce latency and may perform high-speed data transmission by assigning at least two queues.

In the drawing, an example is illustrated in which the first manager 734*a* in the first processor 732*a* manages a first list 738*a* which is a whitelist, and the second manager 734*b* in the second processor 732*b* manages a second list 738*b* which is a whitelist, thereby ensuring the real-time transmission of a high-priority event during the inter-processor communication.

FIGS. 8A to 15B are diagrams referred to in the description of FIG. 7.

First, FIG. 8A illustrates a table Tba storing a periodic CAN message or CAN signal data.

In the drawing, 2048 data are illustrated, but various modifications may be made thereto.

Meanwhile, the table Tba of FIG. 8A may be data of the first message, which may be transmitted periodically from the first processor 732*a* to the second processor 732*b* through the inter-processor communication.

FIG. 8B illustrates a whitelist Tbb managed by the first processor 732*a* or the second processor 732*b*.

The whitelist Tbb may be implemented by Array, Struct, Collection, etc., and may be stored in the first memory 320 or the second memory 330.

Meanwhile, the shared memory 508 may allocate buffers of a size aligned with memory blocks or memory addresses, which will be described below with reference to FIGS. 8C and 8D.

Figure 8C:
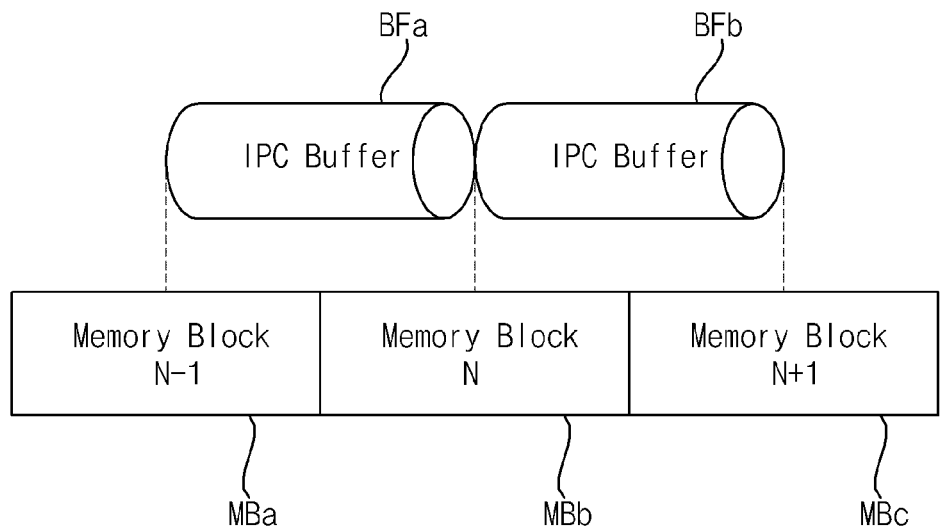
FIGS. 8 to 15B are diagrams referred to in the description of FIG. 7.
Figure 8D:
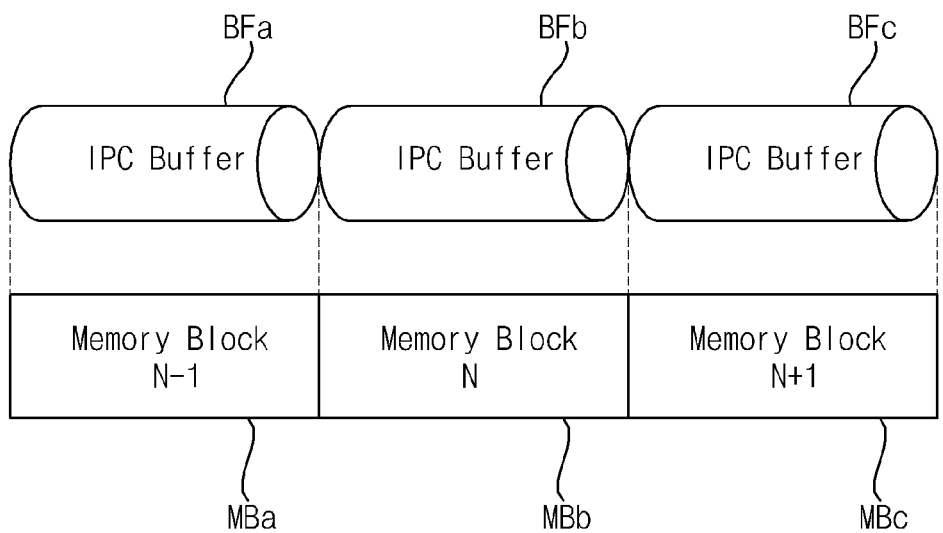

FIGS. 8C and 8D are diagrams illustrating various example of allocating IPC buffers in the shared memory.

First, FIG. 8C illustrates an example of allocating IPC buffers BFa and BFb in the shared memory, in which the IPC buffers BFa and BFb are allocated to boundaries between a plurality of memory blocks or memory addresses MBa to MBc.

As illustrated in the drawing, when the IPC buffers BFa and BFb are allocated to boundaries between the plurality of memory blocks or memory addresses MBa to MBc, it is required to perform fetch (dfetch) twice during memory access for inter-processor communication, thereby leading to degradation in read/write performance.

Then, FIG. 8D illustrates another example of allocating IPC buffers in the shared memory, in which by aligning IPC buffers BFa, BFb, and BFc to boundaries of a plurality of memory blocks or memory addresses MBa to MBc, the IPC buffers BFa, BFb, and BFc are allocated.

As illustrated herein, in the case of allocating the IPC buffers BFa, BFb, and BFc by aligning the IPC buffers BFa, BFb, and BFc to the boundaries of the plurality of memory blocks or memory addresses MBa to MBc, even when fetch (dfetch) is performed only once during memory access for inter-processor communication, read or write operation may be implemented, such that no performance delay occurs. Further, messages in units of memory blocks or memory addresses MBa to MBc may be repeatedly transmitted or received in every cycle.

That is, during the inter-processor communication, the shared memory 508 may allocate buffers of a size aligned with the memory blocks or memory address, thereby reducing memory overhead during memory access.

Meanwhile, the shared memory 508 may set a smaller number of buffers than a number of periodic events for the inter-processor communication, thereby reducing memory overhead during memory access.

Figure 9:
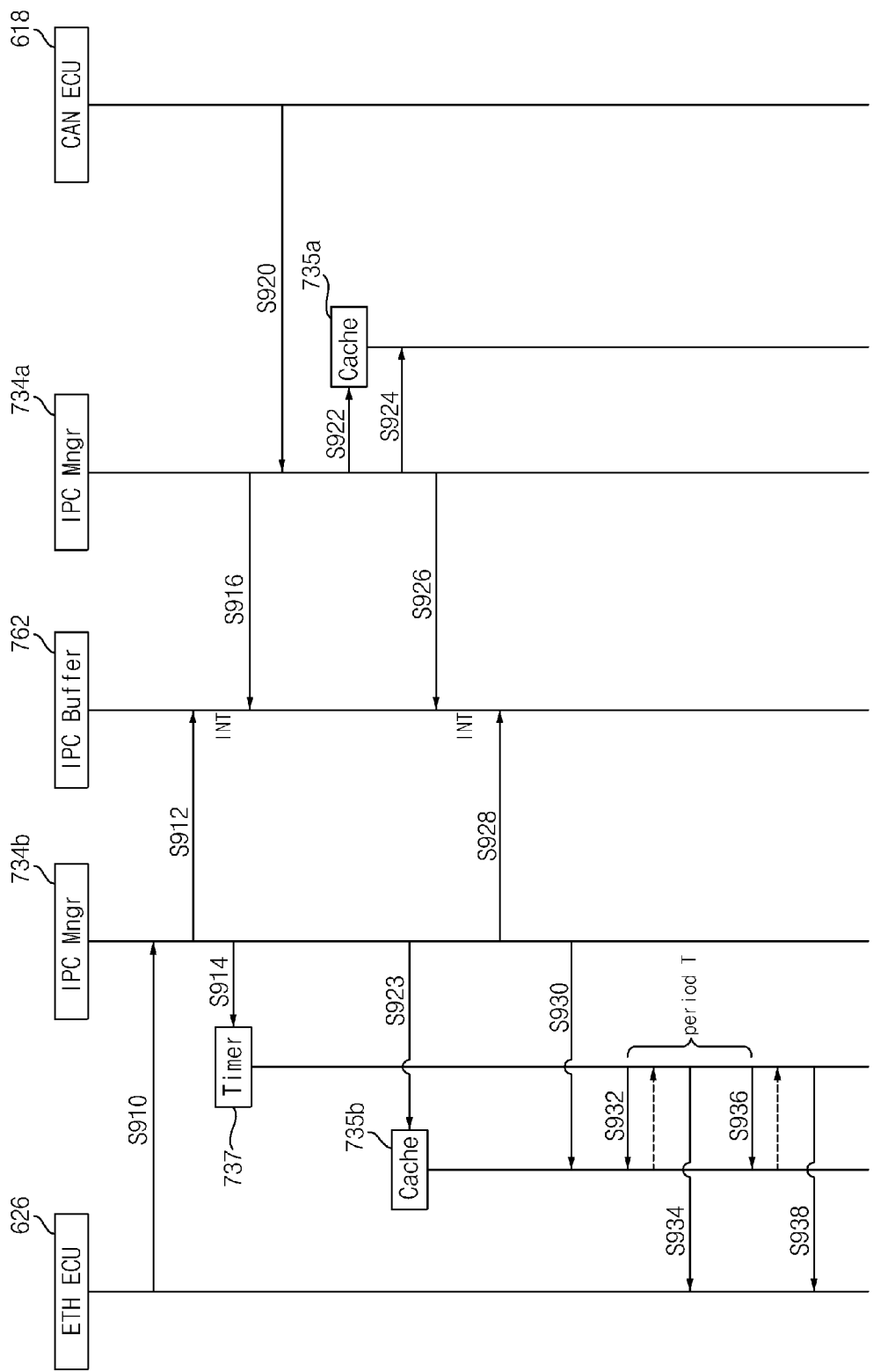

FIG. 9 is a sequence diagram illustrating subscription to a first message.

Referring to the drawing, the Ethernet processor or the Ethernet ECU 626 sends a request for subscription to the first message (S910), and the second manager 734b in the second processor 732b receives the request for subscription to the first message.

For example, the Ethernet processor or the Ethernet ECU 626 may send the request for subscription to the first message, which includes speed data or position information data.

Then, the second manager 734b in the second processor 732b may send the request for subscription to the first message to an IPC buffer 762 in the shared memory 508 (S912).

Subsequently, the second manager 734b may implement the timer 737 in the second manager 734b.

Although not illustrated herein, the request for subscription to the first message, which is sent to the IPC buffer 762 in the shared memory 508, may be delivered to the first manager 734a in the first processor 732a.

Meanwhile, the first manager 734a periodically receives the first message, predefined in the CAN database DB, from at least one CAN ECU 618 and the like.

Meanwhile, the first manager 734a may compare the first message, for which the subscription is requested, with the CAN data or first messages, and may transmit the first message, for which the subscription is requested, to the IPC buffer 762 in the shared memory 508 (S916).

Meanwhile, the first manager 734a may separately process a first message, for which the subscription is not requested, among the periodically received CAN data or first messages, based on internal operations without transmitting the first message to the IPC buffer 762.

Specifically, upon receiving the first message for which the subscription is requested, the first manager 734a may store the first message in the first cache 735a or may manage the first message. Upon receiving the first message, the first manager 734a may compare the first message with a value stored in the first cache 735a, and if a difference therebetween is greater than or equal to a predetermined value, the first manager 734a may send the subscription requested first message to the IPC buffer 762 in the shared memory 508.

Meanwhile, the first message may be transmitted from at least one CAN ECU 618 to the first manager 734a (S920).

Next, the first manager 734a may generate a first cache 735a (S922) and may store the first message in the generated first cache 735a (S924).

Meanwhile, the first manager 734a may send the value stored in the first cache 735a to the IPC buffer 762 in the shared memory 508 (S926).

Meanwhile, after operation S914, the second manager 734b in the second processor 732b may generate a second cache 735b (S923), and upon creating the second cache 735b, the second manager 734b may read a value written to the IPC buffer 762 in the shared memory (S928).

Then, the second manager 734b in the second processor 732b may write the value received from the IPC buffer 762 in the shared memory 508 to the generated second cache 735b (S930).

The timer 737 reads the value written to the second cache 735b in a first period (S932), receives the value written to the second cache 735b, and transmits a first message, corresponding to the value written to the second cache 735b, to the Ethernet processor or the Ethernet ECU 626 (S934).

Subsequently, the timer 737 reads the value written to the second cache 735b in a second period following the first period (S936), receives the value written to the second cache 735b, and transmits a first message, corresponding to the value written to the second cache 735b, to the Ethernet processor or the Ethernet ECU 626 (S938).

Accordingly, the Ethernet processor or the Ethernet ECU 626 may periodically subscribe to the first message, particularly speed information based on CAN communication and the like.

Figure 10:
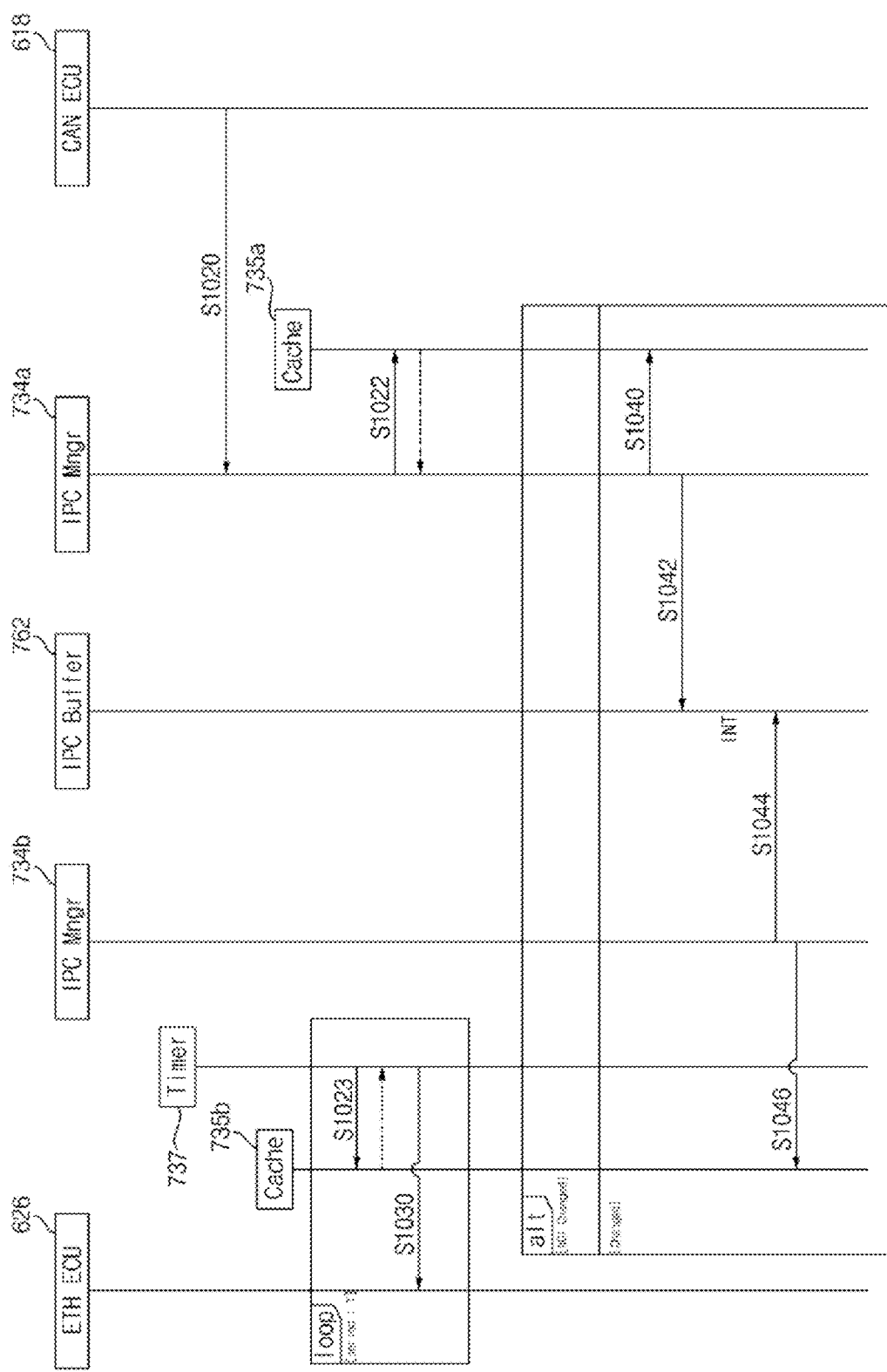

FIG. 10 is a sequence diagram associated with a periodic event.

Referring to the drawing, in response to a request for subscription to the first message from the Ethernet processor or the Ethernet ECU 626, the first message may be transmitted from at least one CAN ECU 618 to the first manager 734a (S1020).

Then, the first manager 734a reads a value stored in the first cache 735a (S1022).

Further, the first manager 734a sends the value stored in the first cache 735a to the IPC buffer 762 in the shared memory 508, and the IPC buffer 762 in the shared memory 508 sends the value stored in the first cache 735a to the second manager 734b, and the second manager 734b writes the received value to the second cache 735b.

Meanwhile, the timer 737 of the second manager 734b in the second processor 732b reads the value written to the second cache 735b (S1023), and transmits a first message, corresponding to the value written to the second cache 735b, to the Ethernet processor or the Ethernet ECU 626 (S1030).

Meanwhile, the first manager 734a in the first processor 732a compares the value stored in the first cache 735a with the received new first message, and if a difference therebetween is greater than or equal to a predetermined value, the first manager 734a may store the new first message.

Specifically, the first cache 735a compares the value stored in the first cache 735a with the received new first message, and if the difference therebetween is greater than or equal to the predetermined value, the first cache 735a may store the new first message.

In this regard, after operation S1030, the first manager 734a in the first processor 732a compares the value stored in the first cache 735a with the received new first message, and if the difference therebetween is less than the predetermined value, the first manager 734a in the first processor 732a may not send the value stored in the first cache 735a to the IPC buffer 762 in the shared memory 508.

Subsequently, the first manager 734a in the first processor 732a compares the value stored in the first cache 735a with the received new first message, and if the difference therebetween is greater than or equal to the predetermined value, the first manager 734a in the first processor 732a may send the value stored in the first cache 735a to the IPC buffer 762 in the shared memory 508.

That is, the first manager 734a in the first processor 732a compares the value stored in the first cache 735a with the received new first message, and if the difference therebetween is greater than or equal to the predetermined value, the first manager 734a in the first processor 732a may write the received new first message to the first cache 735a (S1040), and may send the received new first message to the IPC buffer 762 in the shared memory 508 (S1042).

Then, the second manager 734b in the second processor 732b reads the value written to the IPC buffer 762 in the shared memory 508 (S1044), and writes the value to the second cache 735b (S1046).

As illustrated in FIG. 10, upon receiving the first message for which a subscription is requested, the first manager 734a in the first processor 732a stores the first message in the first cache 735a or manages the first message, and upon receiving the first message, the first manager 734a in the first processor 732a compares the first message with the value stored in the first cache 735a, and if the difference therebetween is greater than or equal to the predetermined value, the first manager 734a in the first processor 732a sends the first message to the second processor 732b through the inter-processor communication, such that cache occupancy or buffer occupancy of the same data may be minimized, thereby reducing latency and performing high-speed data transmission during the inter-processor communication.

Figure 11:
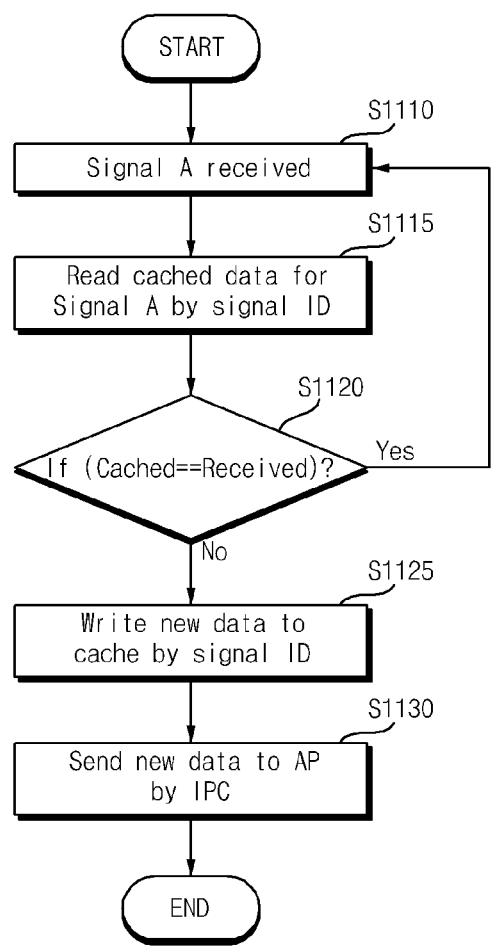

FIG. 11 is a flowchart associated with operation of the first manager 734a in the first processor 732a of FIG. 10.

Referring to the drawing, the first manager 734a in the first processor 732a receives a first message (signal A) based on a request for subscription to the first message from the Ethernet processor or the Ethernet ECU 626 (S1110). Operation S1110 may correspond to operation S1020 of FIG. 10.

Then, based on an ID of the first message, the first manager 734a in the first processor 732a reads cache data for the first message (S1115). Operation S1115 may correspond to operation S1022 of FIG. 10.

That is, the first manager 734a in the first processor 732a reads the value stored in the first cache 735a.

Subsequently, the first manager 734a in the first processor 732a determines whether the value stored in the first cache 735a is the same as the received new first message (signal A) (S1120).

Further, if the value stored in the first cache 735a is the same as the received new first message (signal A), the first manager 734a performs operation S1110 again.

Meanwhile, if the value stored in the first cache 735a is different from the received new first message (signal A), the first manager 734a in the first processor 732a writes the new first message (signal A) to the first cache 735a (S1125). Operation S1125 may correspond to operation S1040 in FIG. 10.

Next, the first manager 734a in the first processor 732a may send the received new first message (signal A) to the IPC buffer 762 in the shared memory 508 (S1130). Operation S1130 may correspond to operation S1042 in FIG. 10.

Figure 12A:
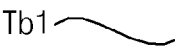
Figure 12C:
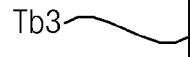

FIGS. 12A to 12C are diagrams illustrating various examples of an IPC buffer table for periodic events.

First, FIG. 12A illustrates a table Tb1 showing periodic event values to be sent.

In the drawing, the table Tb1 may be a first message, for which a subscription is requested from the Ethernet processor or the Ethernet ECU 626.

In the drawing, distance information, communication status information (B_CAN_status), speed information, and the like are illustrated as examples of the first message.

Meanwhile, the periods of each information may vary. In the drawing, the distance information has the shortest period of 10 ms, the communication status information (B_CAN_status) has a period of 20 ms which is longer than the distance information, and the speed information has the longest period of 40 ms.

FIG. 12B illustrates a table Tb2 showing that all the periodic events to be sent are sent to the IPC buffer 762.

Referring to the drawing, the first message including a variety of information of FIG. 12A, particularly data of the same value, are all sent, such that data in 17 indices are written to the IPC buffer 762.

FIG. 12C illustrates a table Tb3 in which usage of the IPC buffer 762 is reduced, according to an embodiment of the present disclosure.

Referring to the drawing, the first message including the variety of information of FIG. 12A is sent, except data having the same value, such that data in 10 indices, which decreases from 17 indices of FIG. 12B, are written to the IPC buffer 762.

That is, as illustrated in FIG. 11, only when the value stored in the first cache 735a is different from the received new first message (signal A), the new first message is sent, thereby reducing the usage of the IPC buffer 762. Further, when a scenario is complicated or the processor is under high load, performance degradation of the IPC buffer 762 may be prevented.

Figure 13:
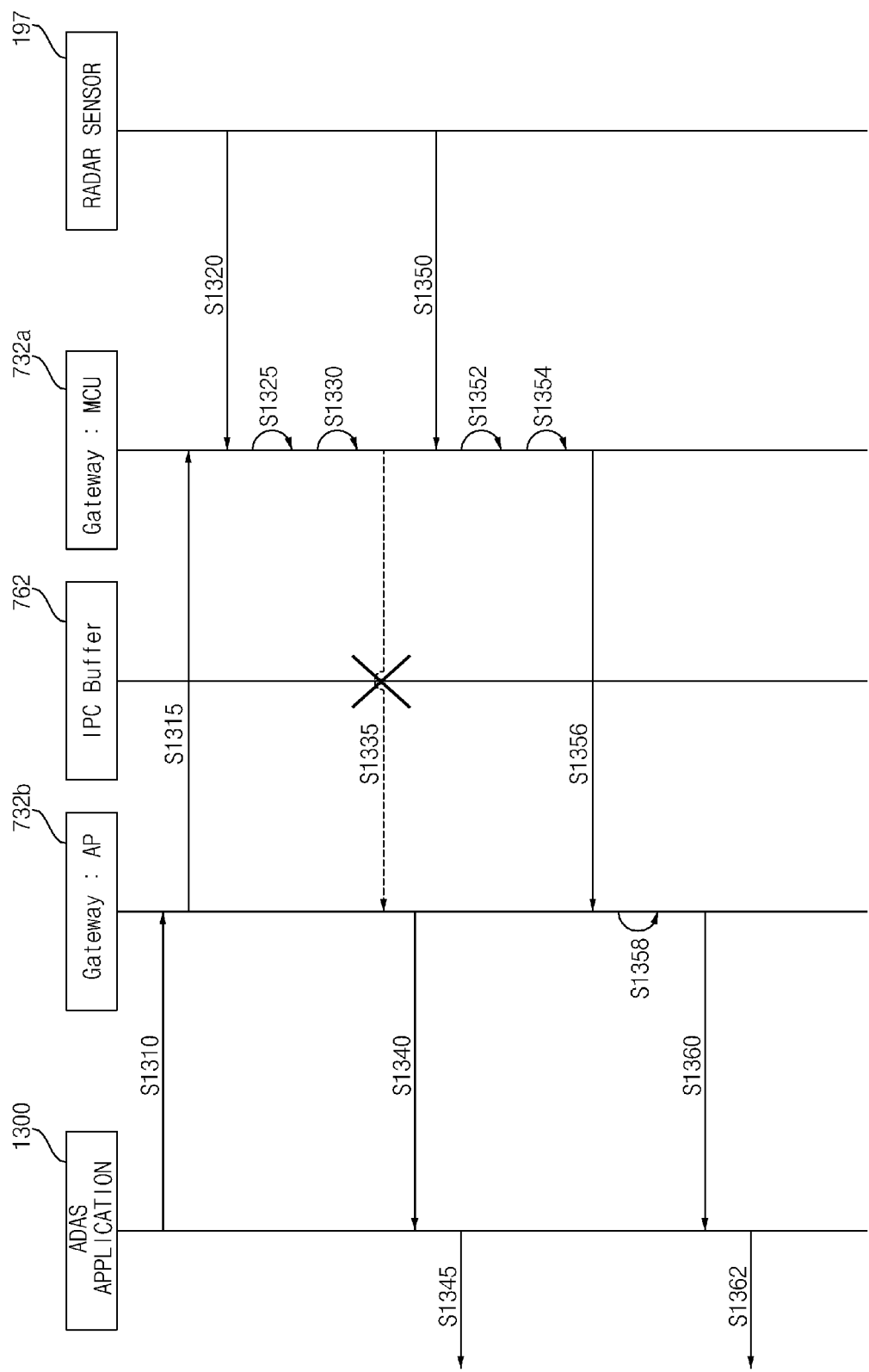

FIG. 13 is a sequence diagram based on an application.

Referring to the drawing, an ADAS application 1300 running on the second processor 732b or a separate processor (not shown) may transmit a request for subscription to information on distance to a preceding vehicle (hereinafter referred to as preceding vehicle distance information) to the second processor 732b (S1310).

Then, the second processor 732b may send the request for subscription to the preceding vehicle distance information to the first processor 732a through the IPC buffer 762 in the shared memory 508 during inter-processor communication (S1315).

Meanwhile, the first processor 732a receives the preceding vehicle distance information from a radar sensor 197 during a first period (S1320).

Subsequently, the first processor 732a retrieves a value in the first cache 735a by a signal ID (S1325).

The first processor 732a compares the received preceding vehicle distance information with a distance information value stored in the first cache 735a, and if the two values are equal to each other or a difference between the values is less than a predetermined value, the first processor 732a drops the received preceding vehicle distance information without storing the information in the first cache 735a (S1330).

Further, the first processor 732a does not send the dropped vehicle distance information to the second processor 732b through the IPC buffer 762 in the shared memory 508 through the inter-processor communication (S1335).

Meanwhile, as the recent preceding vehicle distance information is dropped without being sent, the second processor 732b may send a value, pre-stored in the second cache 735b, as the preceding vehicle distance information to the ADAS application 1300 (S1340).

Next, the ADAS application 1300 may output a control signal, such as a brake control and the like, based on the preceding vehicle distance information which is a value pre-stored in the second cache 735b (S1345).

Meanwhile, the first processor 732a receives the preceding vehicle distance information from the radar sensor 197 during a second period after the first period (S1350).

Then, the first processor 732a retrieves a value in the first cache 735a by the signal ID (S1352).

The first processor 732a compares the received preceding vehicle distance information with a preceding vehicle distance information value stored in the first cache 735a, and if a difference between the two values is greater than or equal to a predetermined value, the first processor 732a stores the received preceding vehicle distance information in the first cache 735a (S1354).

Further, the first processor 732a transmits the stored preceding vehicle distance information to the second processor 732b through the IPC buffer 762 in the shared memory 508 through the inter-processor communication (S1356).

Meanwhile, upon receiving the recent preceding vehicle distance information, the second processor 732b stores the information in the second cache 735b (S1358).

In addition, the second processor 732b sends the value stored in the second cache 735b as preceding vehicle distance information to the ADAS application 1300 (S1360).

Then, the ADAS application 1300 may output a control signal, such as brake control and the like, based on the preceding vehicle distance information which is a value stored in the second cache 735b (S1362).

In the embodiment of FIG. 13, in response to a request for subscription to the preceding vehicle distance information, the second processor 732b transmits the request for subscription to the preceding vehicle distance information to the first processor 732a. The first processor 732a receives the preceding vehicle distance information from the radar sensor, and upon receiving the preceding vehicle distance information, the first processor 732a compares the information with the value stored in the first cache 735a. If a difference therebetween is greater than or equal to a predetermined value, the first processor 732a stores the preceding vehicle distance information in the first cache 735a, and sends the value stored in the first cache 735a to the second processor 732b through the inter-processor communication. Accordingly, the preceding vehicle distance information may be transmitted while reducing latency during the inter-processor communication.

Meanwhile, through the inter-processor communication, the second processor 732b may store the received preceding vehicle distance information in the second cache 735b and may transmit the preceding vehicle distance information, stored in the second cache 735b, to an application which has transmitted the request for subscription to the preceding vehicle distance information. Accordingly, the preceding vehicle distance information may be transmitted while reducing latency during the inter-processor communication.

Meanwhile, in response to a request for subscription to the preceding vehicle distance information, the second processor 732b may send the request for subscription to the preceding vehicle distance information to the first processor 732a. The first processor 732a receives the preceding vehicle distance information from the radar sensor, and upon receiving the preceding vehicle distance information, the first processor 732a compares the information with a value stored in the first cache 735a. If a difference therebetween is less than a predetermined value, the first processor 732a does not store the received preceding vehicle distance information in the first cache 735a, without transmitting the information to the second processor 732b through the inter-processor communication. Accordingly, the preceding vehicle distance information may be transmitted while reducing latency during the inter-processor communication.

Figure 14:
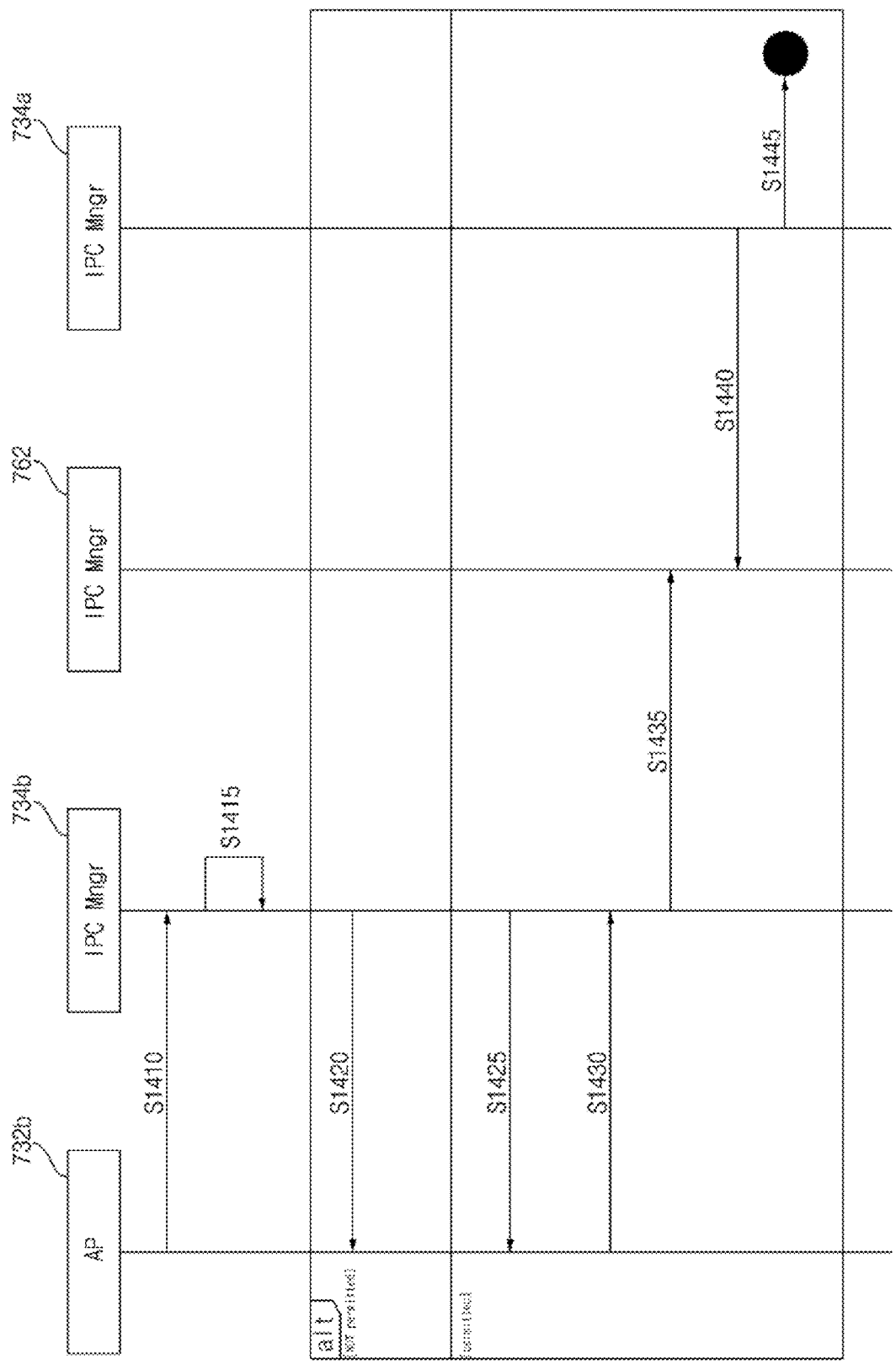

FIG. 14 is a diagram associated with whitelist management.

Referring to the drawing, the second processor 732b transmits information for executing the second queue PTa to the second manager 734b (S1410).

For example, the information for executing the second queue PTa may include position information, or application information associated with the position information and the like.

In another example, the information for executing the second queue PTa may be information associated with the second message.

Then, the second manager 734b checks the second list 738b based on the received information for executing the second queue PTa (S1415).

For example, the second manager 734b determines whether the received information for executing the second queue PTa is included in the second list 738b.

Further, if the received information for executing the second queue PTa is not included in the second list 738b, the second manager 734b transmits a notification that it is impossible to execute the second queue PTa to the second processor 732b (S1420).

By contrast, if the received information for executing the second queue PTa is included in the second list 738b, the second manager 734b transmits a notification that it is possible to execute the second queue PTa to the second processor 732b (S1425).

Accordingly, as the second queue PTa may be executed, the second processor 732b may transmit position information, the second message, or the like to the second manager 734b (S1430).

Subsequently, the second manager 734b may transmit the position information, the second message, or the like to the second queue PTa of the IPC buffer 762 in the shared memory 508 through the inter-processor communication (S1435).

Next, the first manager 734a in the first processor 732a may read the position information or the second message which is a value of the second queue PTa of the IPC buffer 762 in the shared memory 508 (S1440).

In addition, the first manager 734a in the first processor 732a may transmit the read position information or second message to the first processor 732a, which has subscribed to the information, or a separate processor (not shown) (S1445).

As described above, by using the second queue PTa which is a high priority queue, real-time transmission of a high priority event may be ensured.

Figure 15A:
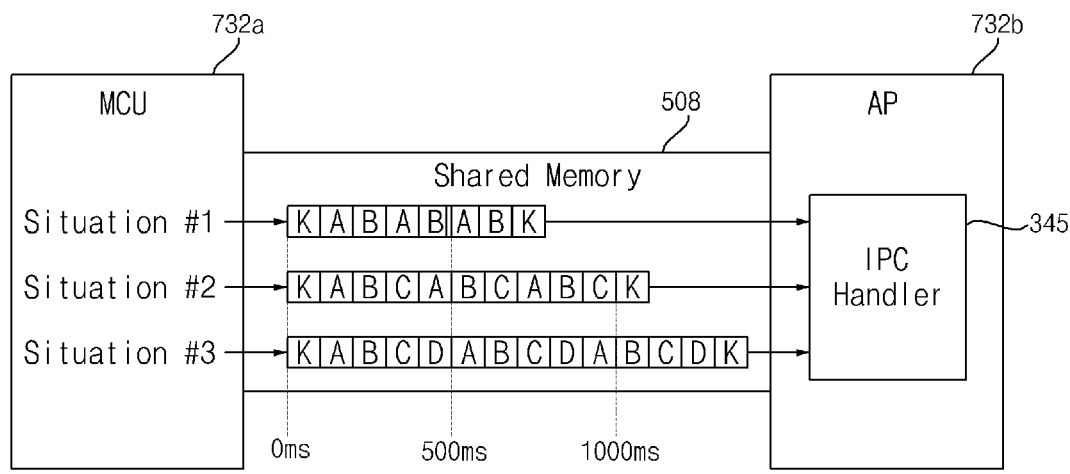

FIG. 15A is a diagram illustrating an inter-processor communication scheme associated with the present disclosure.

Referring to the drawing, in the vehicle communication device 700 of FIG. 7, inter-processor communication between the first processor 732a and the second processor 732b may be performed using the shared memory 508.

Particularly, FIG. 15A illustrates an example of using only the first queue PTa which is a normal priority queue.

Accordingly, when data is transmitted from the first processor 732a to the second processor 732b over three channels, the second processor 732*b* executes one IPC handler 345 to receive data over the three channels.

Meanwhile, in the method of FIG. 15A, as the number of IPC transmission events increases, processing latency occurs, and real-time transmission of a time sensitive-critical event may not be ensured.

Figure 15B:
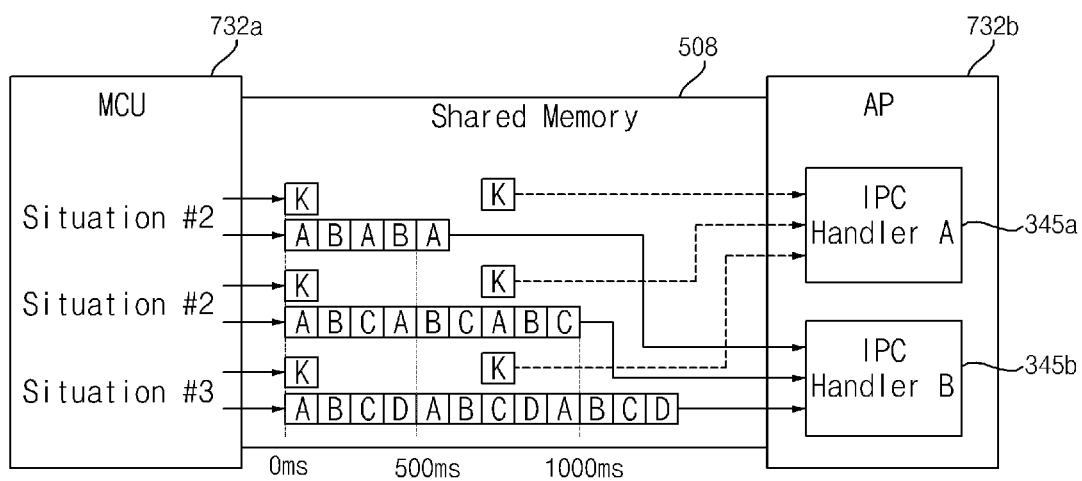

FIG. 15B is a diagram illustrating an inter-processor communication scheme according to an embodiment of the present disclosure.

Referring to the drawing, in the vehicle communication device 700 of FIG. 7, inter-processor communication between the first processor 732*a* and the second processor 732*b* may be performed using the shared memory 508.

Particularly, FIG. 15B illustrates an example of using a combination of the first queue PTa, which is a normal priority queue, and the second queue PTa which is a high priority queue.

Unlike FIG. 15A, FIG. 15B illustrates an example of using the second queue PTa for data "K" separated from the data of the respective channels, and using the first queue PTb for the rest of the data.

Accordingly, the second processor 732*b* may execute a first IPC handler 345*a* for the first queue PTa and a second IPC handler 345*b* for the second queue PTa.

Meanwhile, in the method of FIG. 15B, even when the number of IPC transmission events increases, high priority events may be transmitted in real time by the execution of the second queue PTa. Particularly, a time sensitive-critical event may be transmitted in real time.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A signal processing device comprising:
    a first processor configured to receive a first message including a sensor signal in a vehicle based on a first communication scheme, and to perform signal processing of the received first message;
    a second processor configured to receive a second message including a communication message received from an external source based on a second communication scheme, and to perform signal processing of the received second message; and
    a shared memory configured to operate to transmit the first message or the second message between the first processor and the second processor, wherein
    the first processor comprises a first manager including a first cache for inter-processor communication (IPC); and
    the second processor comprises a second manager including a timer and a second cache for the IPC.

2. The signal processing device of claim 1, wherein upon receiving the first message for which subscription is requested, the first processor is configured to store the first message in the first cache or manage the first message, and upon receiving the first message, the first processor compares the first message with a value stored in the first cache, and in response to a difference therebetween being greater than or equal to a predetermined value, the first processor is configured to transmit the first message to the second processor through the IPC.

3. The signal processing device of claim 1, wherein the second processor is configured to receive a request for subscription to the first message from an Ethernet processor and transmit the request for the subscription through the IPC.

4. The signal processing device of claim 1, wherein upon first receiving the first message, the second processor is configured to store the first message in the second cache, and upon subsequently receiving the first message, the second processor updates the second cache.

5. The signal processing device of claim 1, wherein upon receiving the first message, the second processor generates a thread of the timer, and each time the thread terminates, the second processor is configured to transmit a value in the second cache to an Ethernet processor.

6. The signal processing device of claim 1, wherein during a period in which the IPC is not performed and the first message is not received, the second processor is configured to transmit a value in the second cache to an Ethernet processor.

7. The signal processing device of claim 4, wherein during a period in which the IPC is performed and the first message is received, the second processor is configured to transmit a value in the updated second cache to an Ethernet processor.

8. The signal processing device of claim 1, wherein during the IPC, the shared memory transmits data between the first processor and the second processor through a first queue, and a second queue having a higher priority than the first queue.

9. The signal processing device of claim 8, wherein the shared memory transmits speed data or position information data between the first processor and the second processor through the second queue.

10. The signal processing device of claim 8, wherein the first processor or the second processor manages a list of applications capable of using the second queue.

11. The signal processing device of claim 8, wherein in case in which a number of events for the IPC increases, the shared memory transmits only data, corresponding to events allocated for the second queue, through the second queue.

12. The signal processing device of claim 1, wherein during the IPC, the shared memory allocates buffers of a size aligned with memory blocks or memory addresses.

13. The signal processing device of claim 1, wherein the shared memory sets a smaller number of buffers than a number of periodic events for the IPC.

14. The signal processing device of claim 1, wherein in response to a request for subscription to preceding vehicle distance information, the second processor is configured to transmit the request for subscription to the preceding vehicle distance information to the first processor,
    wherein the first processor receives the preceding vehicle distance information from a radar sensor, and upon receiving the preceding vehicle distance information, the first processor compares the preceding vehicle distance information with a value stored in the first cache, and in response to a difference therebetween being greater than or equal to a predetermined value, the first processor is configured to store the preceding vehicle distance information in the first cache and sends the value stored in the first cache to the second processor through the IPC.

15. The signal processing device of claim 14, wherein through the IPC, the second processor is configured to store the preceding vehicle distance information in the second cache and transmit the preceding vehicle distance information stored in the second cache to an application which has transmitted the request for subscription to the preceding vehicle distance information.

16. The signal processing device of claim 1, wherein in response to a request for subscription to preceding vehicle distance information, the second processor is configured to transmit the request for subscription to the preceding vehicle distance information to the first processor,
wherein the first processor receives the preceding vehicle distance information from a radar sensor, and upon receiving the preceding vehicle distance information, the first processor compares the preceding vehicle distance information with a value stored in the first cache, and in response to a difference therebetween being less than a predetermined value, the first processor is configured to not store the received preceding vehicle distance information in the first cache and not transmit the preceding vehicle distance information to the second processor through the IPC.

17. The signal processing device of claim 1, wherein the first processor is configured to perform as a message router,
wherein the message router converts the first message by converting a frame of the first message into a frame format of the second message, and transmits the converted first message to the second processor.

18. A signal processing device comprising:
a first processor configured to receive a first message including a sensor signal in a vehicle based on a first communication scheme, and to perform signal processing of the received first message;
a second processor configured to receive a second message including a communication message received from an external source based on a second communication scheme, and to perform signal processing of the received second message;
a shared memory configured to operate to transmit the first message or the second message between the first processor and the second processor;
a first memory including an IPC channel; and
a second memory storing sensor data including vehicle speed data,
wherein the shared memory is comprised in the first memory.

19. A vehicle communication device comprising a signal processing device,
wherein the signal processing device comprises:
a first processor configured to receive a first message including a sensor signal in a vehicle based on a first communication scheme, and to perform signal processing of the received first message;
a second processor configured to receive a second message including a communication message received from an external source based on a second communication scheme, and to perform signal processing of the received second message; and
a shared memory configured to operate to transmit the first message or the second message between the first processor and the second processor, wherein
the first processor comprises a first manager including a first cache for inter-processor communication (IPC); and
the second processor comprises a second manager including a timer and a second cache for the IPC.

* * * * *